United States Patent
Toyoda

(10) Patent No.: US 10,418,851 B2
(45) Date of Patent: Sep. 17, 2019

(54) UNINTERRUPTIBLE POWER SUPPLY DEVICE

(71) Applicant: TOSHIBA MITSUBISHI-ELECTRIC INDUSTRIAL SYSTEMS CORPORATION, Chuo-ku (JP)

(72) Inventor: Masaru Toyoda, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 15/777,723

(22) PCT Filed: Dec. 2, 2015

(86) PCT No.: PCT/JP2015/083890
§ 371 (c)(1),
(2) Date: May 21, 2018

(87) PCT Pub. No.: WO2017/094142
PCT Pub. Date: Jun. 8, 2017

(65) Prior Publication Data
US 2018/0375372 A1    Dec. 27, 2018

(51) Int. Cl.
*H02J 9/06* (2006.01)
*H02J 9/04* (2006.01)

(52) U.S. Cl.
CPC .......... *H02J 9/062* (2013.01); *H02J 9/04* (2013.01); *H02J 9/06* (2013.01)

(58) Field of Classification Search
CPC .............. H02J 9/04; H02J 9/06; H02J 9/062
USPC ...................................................... 307/64, 66
See application file for complete search history.

(56) References Cited

U.S. PATENT DOCUMENTS 8,350,410 B2 *  1/2013  Murai ............... H02J 9/062
                                                       307/64
2010/0110731 A1  5/2010  Murai

FOREIGN PATENT DOCUMENTS

JP    2010-115008 A    5/2010

OTHER PUBLICATIONS

International Search Report dated Feb. 23, 2016 in PCT/JP2015/083890 filed Dec. 2, 2015.

* cited by examiner

*Primary Examiner* — Hal Kaplan
(74) *Attorney, Agent, or Firm* — Oblon, McClelland, Maier & Neustadt, L.L.P.

(57) ABSTRACT

A control device controls an uninterruptible power supply device such that a transition is made to an inverter power supply mode when a power source abnormality detecting unit detects a power failure of an AC power source in a case where a commercial power supply mode is selected. The power source abnormality detecting unit computes an estimated value of the maximum value of AC input voltage, based on detected values of the instantaneous value and the phase of AC input voltage supplied to an input terminal. The power source abnormality detecting unit is configured to store temporal transition of the maximum value when the AC power source undergoes a simulated power failure and determine a power failure of the AC power source, based on comparison between temporal transition of the estimated value of the maximum value and the stored temporal transition of the maximum value during power failure.

5 Claims, 18 Drawing Sheets

UNINTERRUPTIBLE POWER SUPPLY DEVICE

TECHNICAL FIELD

The present invention relates to an uninterruptible power supply device, and more specifically to an uninterruptible power supply device configured to selectively execute commercial power supply and inverter power supply.

BACKGROUND ART

Conventionally, an uninterruptible power supply device includes a converter for converting alternating-current (AC) power from an AC power source into direct-current (DC) power, an inverter for converting DC power generated by the converter or DC power of a power storage device into AC power and supplying the AC power to a load, a bypass circuit connected between the AC power source and the load, and a control device for controlling those components.

In the uninterruptible power supply device above, during normal operation in which AC power is supplied normally from the AC power source, AC power generated by the inverter is supplied to the load, whereas when the inverter is failed, AC power from the AC power source is supplied to the load through the bypass circuit. This system is called an on-line power supply system. The on-line power supply system has an advantage that high-quality AC power with small voltage fluctuations can be supplied to the load, irrespective of the quality of the AC power source. Meanwhile, this system has the drawback of low efficiency because power loss always occurs in the inverter.

In another system, AC power from the AC power source is supplied to the load via the bypass circuit during normal operation, whereas during power failure, DC power of the power storage device is converted by the inverter into AC power to supply the load. This system is called a standby power supply system. The standby power supply system has an advantage that power loss is small and the efficiency is high. Meanwhile, this system has the drawback that low-quality AC power with large voltage fluctuations that is supplied from the AC power source is supplied to the load.

For example, Japanese Patent Laying-Open No. 2010-115008 (Patent Document 1) discloses an uninterruptible power supply device configured to detect a state of AC power supplied from an AC power source and select one of the on-line power supply system and the standby power supply system according the detection result.

CITATION LIST

Patent Document

PTD 1: Japanese Patent Laying-Open No. 2010-115008

SUMMARY OF INVENTION

Technical Problem

In Patent Document 1 above, a reference value for determining an abnormality of the AC power source is set for the voltage and frequency of AC power supplied from the AC power source. Then, if the detected value of voltage and frequency of AC power falls within the range of reference value, it is determined that the AC power source is normal, and the standby power supply system is selected. On the other hand, if the detected value deviates from the range of reference value, it is determined that the AC power source is abnormal, and the on-line power supply system is selected.

Here, in the standby power supply system, when a power failure occurs in the AC power source, the bypass circuit is turned off and thereafter the inverter is activated to make a transition from the commercial power supply to the inverter power supply. During the transition from the commercial power supply to the inverter power supply, the voltage output from the load drops instantaneously (which is called an instantaneous voltage drop), which leads to poor reliability. In order to prevent such an instantaneous voltage drop, it is requested to detect a power failure of the AC power source fast and enable a transition to the inverter power supply.

Unfortunately, in the configuration in which an abnormality of the AC power source is determined based on the detected value of voltage and frequency of AC power supplied from the AC power source as in Patent Document 1 above, it takes time to determine whether the detected value deviates from the range of reference value. As a result, the degree of instantaneous voltage drop (the instantaneous power failure time and the degree of voltage drop) is increased to have a significant effect on the load.

The present invention is made in order to solve such a problem, and an object of the present invention is to provide an uninterruptible power supply device capable of preventing an instantaneous voltage drop during a transition from commercial power supply to inverter power supply.

Solution to Problem

An uninterruptible power supply device according to the present invention is connected between an AC power source and a load. The uninterruptible power supply device includes an input terminal receiving AC power output from the AC power source, an output terminal connected to the load, a converter connected to the input terminal and configured to convert the AC power into DC power, an inverter configured to convert DC power output by the converter or DC power of a power storage device into AC power, a first switch connected between the input terminal and the output terminal, a second switch connected between the inverter and the output terminal, and a control device configured to control the uninterruptible power supply device. The uninterruptible power supply device is configured to selectively execute a first mode and a second mode. The first mode is a mode in which the first switch is turned on and the second switch is turned off to supply AC power from the AC power source to the load through the first switch. The second mode is a mode in which the second switch is turned on and the first switch is turned off to supply AC power generated by the inverter to the load. The control device includes a power source abnormality detecting unit configured to detect a power failure of the AC power source, and a control unit configured to control on/off of the first and second switches and power conversion in the inverter so as to make a transition to the second mode, when a power failure of the AC power source is detected in a case where the first mode is selected. The power source abnormality detecting unit includes a voltage detecting unit configured to detect an instantaneous value of AC input voltage supplied from the AC power source to the input terminal, a phase detecting unit configured to detect a phase of the AC input voltage, a computation unit configured to compute an estimated value of a maximum value of the AC input voltage, based on detected values of the voltage detecting unit and the phase detecting unit, a first storage unit configured to store temporal transition of the maximum value when the AC power source undergoes a simulated power failure, and a determination unit configured to determine a power failure of the AC power source, based on comparison between temporal transition of the estimated value of the maximum value and temporal transition of the maximum value stored in the first storage unit.

Preferably, each of the first switch and the second switch is configured with a mechanical switch. The uninterruptible power supply device further includes a semiconductor switch connected in parallel with the first switch. The control unit is configured to turn on the semiconductor switch for a predetermined time when a transition is made from the first mode to the second mode.

Preferably, the determination unit is further configured to determine whether there is a possibility of power failure of the AC power source, based on temporal transition of the estimated value of the maximum value, when it is determined that the AC power source is normal. In a case where the first mode is selected the control unit is configured to turn on the semiconductor switch and turn off the first switch to continue the first mode when it is determined that there is a possibility of power failure of the AC power source. When a power failure of the AC power source is determined, the control unit is configured to turn on the second switch and turn off the semiconductor switch to make a transition to the second mode.

Preferably, the first storage unit is configured to store a plurality of temporal transitions of the maximum value with maximum value decrease rates different from each other. The determination unit is configured to determine a power failure of the AC power source, based on comparison between temporal transition of the maximum value selected from among the plurality of temporal transitions of the maximum value and temporal transition of the estimated value of the maximum value.

Preferably, the uninterruptible power supply device further includes a second storage unit configured to store temporal transition of the estimated value of the maximum value. The first storage unit is configured to learn temporal transition of the maximum value during power failure, based on temporal transition of the estimated value of the maximum value stored in the second storage unit. The determination unit is configured to determine a power failure of the AC power source, based on comparison between temporal transition of the estimated value of the maximum value and a learning value of temporal transition of the maximum value during power failure updated in the first storage unit.

Advantageous Effects of Invention

The present invention provides an uninterruptible power supply device capable of preventing an instantaneous voltage drop during transition from commercial power supply to inverter power supply.

DESCRIPTION OF EMBODIMENTS

Embodiments of the present invention will be described in detail below with reference to the drawings. It should be noted that the same or corresponding parts are denoted by the same reference signs and a description thereof will not be repeated.

First Embodiment (Configuration of Uninterruptible Power Supply Device)

Figure 1:
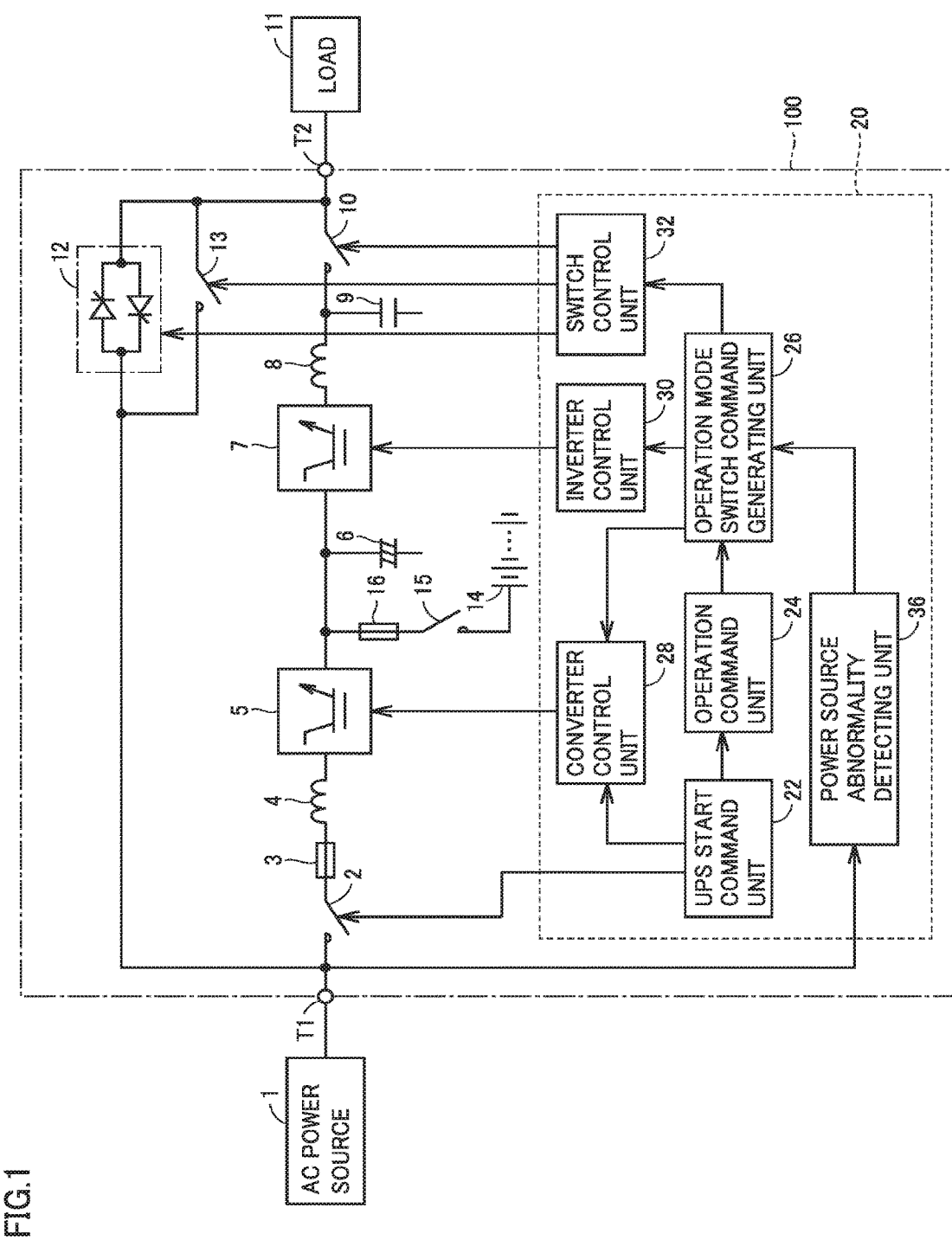
FIG. 1 is an overall configuration diagram of an uninterruptible power supply device according to a first embodiment.

FIG. 1 is an overall configuration diagram of an uninterruptible power supply device 100 according to a first embodiment. Referring to FIG. 1, uninterruptible power supply device 100 according to the first embodiment is connected between an AC power source 1 and a load 11.

AC power source 1 is an AC power source that supplies AC power to uninterruptible power supply device 100. AC power source 1 is configured with, for example, a commercial AC power source or a self generator. In FIG. 1 and the drawings described below, a commercial power source of three-phase three-wire system is illustrated as an example of AC power source 1. For simplicity of drawings and explanation, a circuit of one phase alone is representatively shown in FIG. 1. However, the kind of the AC power source is not limited to the three-phase three-wire system but may be, for example, a power source of three-phase four-wire system or a power source of single-phase three-wire system.

Uninterruptible power supply device 100 includes an input terminal T1 and an output terminal T2. Input terminal T1 receives AC power supplied from AC power source 1. Output terminal T2 is connected to load 11. Load 11 is driven by AC power supplied from uninterruptible power supply device 100.

Uninterruptible power supply device 100 further includes electromagnetic contactors (contactors) 2, 10, 13, a fuse 3, reactors 4, 8, a converter 5, an electrolytic capacitor 6, an inverter 7, a capacitor 9, a thyristor switch 12, and a control device 20. Among those, contactor 2, fuse 3, reactor 4, converter 5, inverter 7, reactor 8, and contactor 10 are connected in series between input terminal T1 and output terminal T2.

Contactor 2 is connected to a current-carrying path between input terminal T1 and converter 5. Contactor 2 is closed (on) during normal operation in which AC power is supplied normally from AC power source 1, and opened (off), for example, during maintenance of uninterruptible power supply device 100. Fuse 3 is inserted to the current-carrying path between input terminal T1 and converter 5 in order to prevent overcurrent from flowing from AC power source 1. Reactor 4 allows AC power from AC power source 1 to pass and prevents a signal with a switching frequency produced in converter 5 from propagating to AC power source 1.

Converter 5 and inverter 7 are configured with semiconductor switching elements. For example, an IGBT (Insulated Gate Bipolar Transistor) is used as the semiconductor switching element. The PWM (Pulse Width Modulation) control may be employed as the control method of the semiconductor switching element.

During normal operation, converter 5 converts three-phase AC power supplied from AC power source 1 into DC power. The DC power generated by converter 5 is supplied to inverter 7 and storage battery 14. During power failure in which supply of AC power from AC power source 1 is stopped, the operation of converter 5 is stopped. The power conversion in converter 5 is controlled by control device 20 (converter control unit 28).

Electrolytic capacitor 6 is connected to the output terminal of converter 5 and smooths the output voltage of converter 5. During normal operation, inverter 7 converts the DC power smoothed by electrolytic capacitor 6 into three-phase AC power with a commercial frequency. During power failure, inverter 7 converts DC power of storage battery 14 into three-phase AC power with a commercial frequency. The power conversion in inverter 7 is controlled by control device 20 (inverter control unit 30).

Reactor 8 and capacitor 9 constitute a filter for removing the component of the switching frequency included in the AC power output from inverter 7.

Contactor 10 turns on during a mode (second mode) in which AC power is supplied from inverter 7 to load 11. Contactor 10 turns off during a mode (first mode) in which AC power is supplied from AC power source 1 to load 11 through contactor 13. The on/off of contactor 10 is controlled by control device 20 (switch control unit 32).

In the present embodiment, the operation mode (first mode) in which AC power is supplied from AC power source 1 to load 11 through contactor 13 may be referred to as "commercial power supply mode". The operation mode (second mode) in which AC power is supplied from inverter 7 to load 11 may be referred to as "inverter power supply mode".

In the inverter power supply mode, the AC power supplied from AC power source 1 is converted into DC power by converter 5, and the DC power is converted by inverter 7 into AC power, which in turn is supplied to load 11. The inverter power supply mode is thus superior in stability of power supply to load 11. On the other hand, in the inverter power supply mode, it is difficult to achieve high efficiency in uninterruptible power supply device 100 because power loss associated with power conversion occurs in each of converter 5 and inverter 7.

By contrast, in the commercial power supply mode, AC power supplied from AC power source 1 is supplied to load 11 through contactor 13, in other words, without passing through converter 5 or inverter 7. This suppresses power loss in converter 5 and inverter 7 and therefore can improve the operation efficiency of uninterruptible power supply device 100. Also in the commercial power supply mode, converter 5 may be operated so that DC power is stored in storage battery 14.

Thyristor switch 12 and contactor 13 are connected in parallel between input terminal T1 and output terminal T2. In the present embodiment, the parallel circuit of thyristor switch 12 and contactor 13 may be referred to as "bypass circuit".

Thyristor switch 12 turns on/off in response to a control signal from control device 20 (switch control unit 32). Specifically, thyristor switch 12 turns on for a predetermined time in response to a control signal from control device 20 when a transition is made from the inverter power supply mode to the commercial power supply mode and when a transition is made from the commercial power supply mode to the inverter power supply mode. In response to a control signal from control device 20 (switch control unit 32), contactor 13 turns off during the inverter power supply mode and turns on during the commercial power supply mode. Contactor 13 constitutes the "first switch" in the present invention, and contactor 10 constitutes the "second switch" in the present invention. Contactors 13 and 10 correspond to an embodiment of the "mechanical switch" in the present invention. Thyristor switch 12 corresponds to an embodiment of the "semiconductor switch" in the present invention.

Storage battery 14 is a power storage device for supplying DC power to inverter 7 during power failure. Storage battery 14 stores DC power generated by converter 5 during normal operation. Fuse 16 and contactor 15 are connected in series between the DC-side terminal of converter 5 and storage battery 14. Contactor 15 is turned on during normal operation and turned off, for example, during maintenance of uninterruptible power supply device 100 and storage battery 14. Fuse 16 prevents overcurrent from flowing into converter 5 and storage battery 14.

Control device 20 is configured to control the on/off of control contactors 10, 13 and thyristor switch 12 and the power conversion in converter 5 and inverter 7 such that uninterruptible power supply device 100 selectively executes the inverter power supply mode and the bypass power supply mode.

The control configuration of control device 20 in uninterruptible power supply device 100 will be described below.

Control device 20 includes a UPS start command unit 22, an operation command unit 24, an operation mode switch command generating unit 26, a converter control unit 28, an inverter control unit 30, and a switch control unit 32.

UPS start command unit 22 generates a start command to request activation of uninterruptible power supply device 100. For example, a switch for requesting activation of uninterruptible power supply device 100 is provided so that UPS start command unit 22 generates a start command when the switch is turned on by a user. Alternatively, a start command may be automatically generated according to predetermined schedule, rather than providing a switch.

UPS start command unit 22 outputs the start command to converter control unit 28 and operation command unit 24. UPS start command unit 22 further turns on contactor 2 such that a current-carrying path is formed between input terminal T1 and converter 5.

Converter control unit 28 receives the start command and then allows converter 5 to operate in order to store DC power in storage battery 14. Specifically, converter control unit 28 controls the power conversion in converter 5 in accordance with the battery remaining capacity of storage battery 14 such that storage battery 14 reaches a predetermined full charge state.

Operation command unit 24 receives the start command and then generates an operation command for giving an instruction to start power supply from uninterruptible power supply device 100 to load 11.

Operation mode switch command generating unit 26 receives the operation command from operation command unit 24 and then selects one of the commercial power supply mode and the inverter power supply mode as the operation mode of uninterruptible power supply device 100, based on an output signal from power source abnormality detecting unit 36.

Power source abnormality detecting unit 36 detects an abnormality in AC power source 1 that leads to a power failure. Specifically, power source abnormality detecting unit 36 detects AC voltage (which hereinafter may be referred to as "AC input voltage") supplied from AC power source 1 to input terminal T1 and determines whether AC power is supplied normally from AC power source 1 (that is, whether a power failure occurs) based on the detected value. Power source abnormality detecting unit 36 outputs a signal indicating the determination result to operation mode switch command generating unit 26. The detection of a power failure in power source abnormality detecting unit 36 will be described later.

Operation mode switch command generating unit 26 selects the commercial power supply mode during normal operation in which AC power is supplied normally from AC power source 1. On the other hand, when a power failure of AC power source 1 is detected, operation mode switch command generating unit 26 selects the inverter power supply mode. Alternatively, the commercial power supply mode may be selected when a request to execute the commercial power supply mode is accepted from an upper-level control unit (not shown) during normal operation.

When the selected operation mode is the commercial power supply mode, operation mode switch command generating unit 26 sets the commercial power supply command ON and sets the inverter power supply command OFF. On the other hand, when the selected operation mode is the inverter power supply mode, the commercial power supply command is set OFF and the inverter power supply command is set ON. Operation mode switch command generating unit 26 outputs the commercial power supply command and the inverter power supply command to converter control unit 28, inverter control unit 30, and switch control unit 32.

When the inverter power supply command is ON (the commercial power supply command is OFF), inverter control unit 30 controls power conversion in inverter 7 such that AC voltage synchronized with the AC voltage supplied from AC power source 1 is output from inverter 7. It is noted that after a power failure of AC power source 1 is detected, inverter 7 is controlled to achieve synchronization with the AC voltage supplied from AC power source 1 before occurrence of the power failure. Specifically, inverter control unit 30 generates a gate signal for tuning on/off the semiconductor switching element included in inverter 7 by PWM control and outputs the generated gate signal to a gate drive circuit in inverter 7.

On the other hand, when the commercial power supply command is ON (the inverter power supply command is OFF), inverter control unit 30 does not output the generated gate signal to the gate drive circuit. Thus, inverter 7 is not operated during the commercial power supply mode and is on standby until a gate signal is given (gate signal input-waiting state).

Switch control unit 32 controls the on/off of the bypass circuit (thyristor switch 12 and contactor 13) and contactor 10 in accordance with the commercial power supply command and the inverter power supply command. Specifically, switch control unit 32 turns on contactor 13 and turns off contactor 10 when the commercial power supply command is ON (the inverter power supply command is OFF). When contactor 13 is turned on, switch control unit 32 turns on thyristor switch 12 for a predetermined time. Switch control unit 32 also turns on contactor 13 and turns off contactor 10 when the inverter power supply command is ON (the commercial power supply command is OFF). When contactor 13 is turned off, switch control unit 32 turns on thyristor switch 12 for a predetermined time.

As described above, during normal operation in which AC power is supplied normally from AC power source 1, uninterruptible power supply device 100 executes the commercial power supply mode automatically or in response to a request from an upper-level control unit. Then, when a power failure of AC power source 1 is detected during the commercial power supply mode, uninterruptible power supply device 100 makes a transition from the commercial power supply mode to the inverter power supply mode.

(Detection of Power Failure in AC Power Source)

In a common method of detecting a power failure of AC power source 1, the maximum value (or effective value) of AC voltage (AC input voltage) supplied from AC power source 1 is detected, and a power failure of AC power source 1 is determined based on the detected value. The common detection method will be described below.

Figure 2:
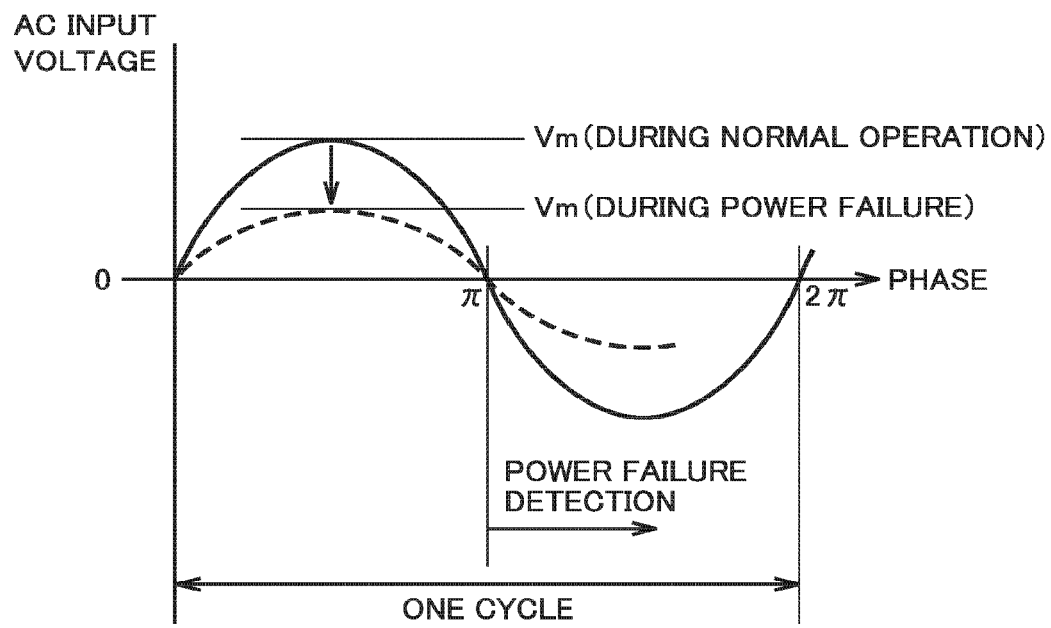
FIG. 2 is a diagram for explaining a common detection method for detecting a power failure of an AC power source.

FIG. 2 shows the waveform of AC input voltage when AC power source 1 is normal and the waveform of AC input voltage when a power failure occurs in AC power source 1. In a case where AC power source 1 is a commercial power source, one cycle is 20 msec when the power source frequency is 50 Hz, and 16.7 msec when the power source frequency is 60 Hz. It is assumed that the sampling number in one cycle is, for example, 200.

When a power failure occurs in AC power source 1, the maximum value Vm of AC input voltage gradually decreases from the maximum value Vm when the AC power source 1 is normal (during normal operation).

In the common detection method, the maximum value (or effective value) of AC input voltage is acquired based on the detected value of instantaneous value of AC input voltage in the first half cycle. Then, in the second half cycle, whether a power failure occurs in AC power source 1 is determined by comparing the acquired maximum value (or effective value) with a predetermined reference value.

In the common detection method described above, however, a power failure is detected about a half cycle behind after occurrence of the power failure. If there is a delay in detecting a power failure in this way, an instantaneous voltage drop may occur, that is, the voltage output from output terminal T2 drops instantaneously, during the transition from the commercial power supply mode to the inverter power supply mode. It is thus requested that a power failure of AC power source 1 can be detected faster.

Considering the problem above, power source abnormality detecting unit 36 according to the present embodiment detects a power failure of AC power source 1 as follows.

Figure 3:
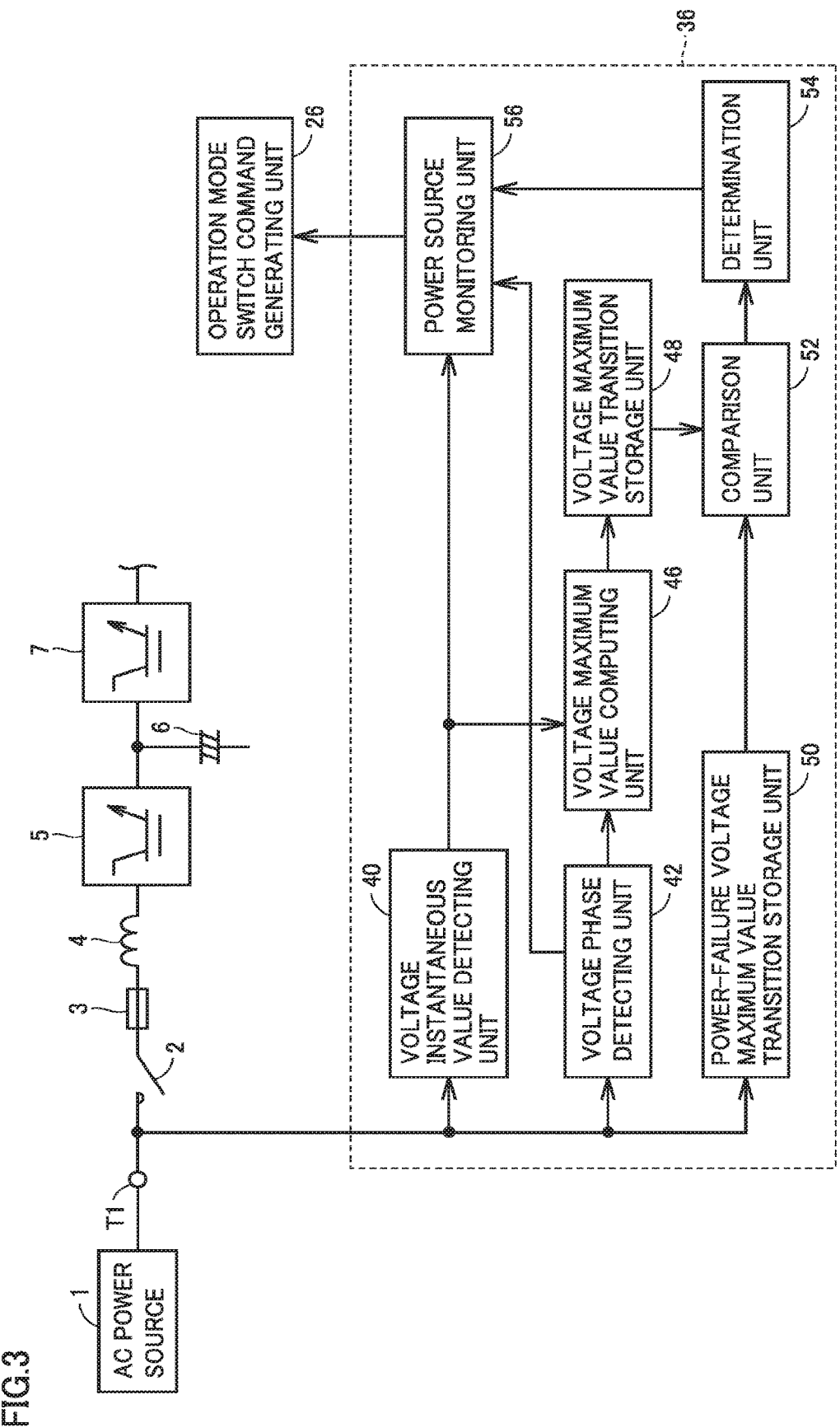
FIG. 3 is a functional block diagram showing a control configuration of the power source abnormality detecting unit in FIG. 1.

FIG. 3 is a functional block diagram showing a control configuration of power source abnormality detecting unit 36 in FIG. 1.

Referring to FIG. 3, power source abnormality detecting unit 36 includes a voltage instantaneous value detecting unit 40, a voltage phase detecting unit 42, a voltage maximum value computing unit 46, a voltage maximum value transition storage unit 48, a power-failure voltage maximum value transition storage unit 50, a comparison unit 52, a determination unit 54, and a power source monitoring unit 56.

Voltage instantaneous value detecting unit 40 detects an instantaneous value of AC input voltage. Voltage instantaneous value detecting unit 40 outputs a signal indicating the detected value to voltage maximum value computing unit 46 and power source monitoring unit 56.

Voltage phase detecting unit 42 detects the phase of AC input voltage. Voltage phase detecting unit 42 outputs a signal indicating the detected value to voltage maximum value computing unit 46.

Voltage maximum value computing unit 46 estimates the maximum value Vm of AC input voltage, based on the output signals of voltage instantaneous value detecting unit 40 and voltage phase detecting unit 42. The estimated value of the maximum value Vm may be hereinafter denoted by "maximum value estimated value Vme".

Figure 4:
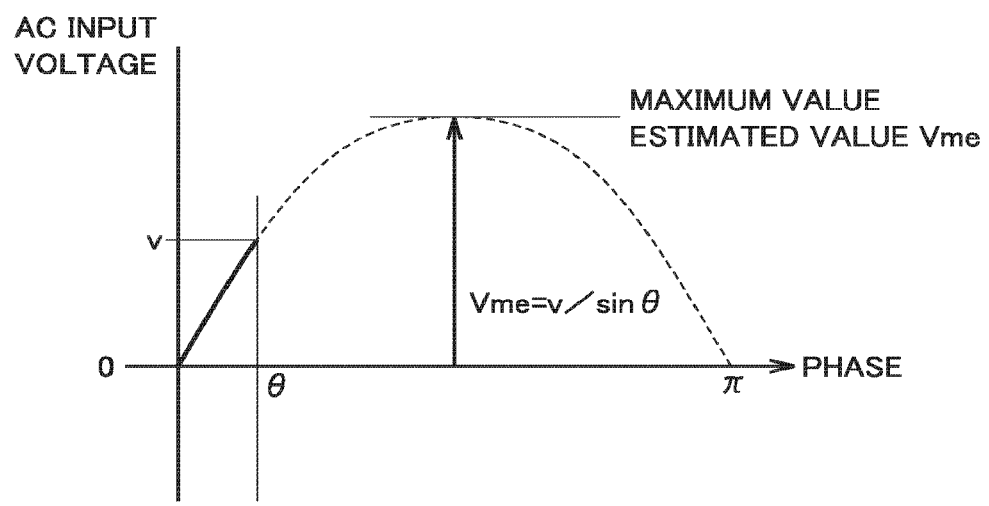
FIG. 4 is a diagram for explaining estimation computation of the maximum value of AC input voltage.

FIG. 4 is a diagram for explaining the estimation computation of the maximum value of AC input voltage. Supposing that AC power source 1 is a distortion-free sinusoidal AC power source, the instantaneous value v of AC input voltage is represented by Equation (1) below using the maximum value Vm and the phase θ of AC input voltage:

$$v = Vm \cdot \sin \theta \quad (1).$$

In FIG. 4, the waveform of AC input voltage in a positive half cycle period of $\pi \geq \theta \geq 0$ is shown by a dashed line. When the instantaneous value v of AC input voltage is detected by voltage instantaneous value detecting unit 40 and the phase θ is detected by voltage phase detecting unit 42, the maximum value estimated value Vme can be calculated by substituting these detected values into Equation (2) below obtained by modifying Equation (1):

$$Vme = v / \sin \theta \quad (2).$$

The computation of the maximum value estimated value Vme may be executed in synchronization with sampling of AC input voltage in voltage instantaneous value detecting unit 40 and voltage phase detecting unit 42 or may be executed asynchronously with the sampling.

Voltage maximum value transition storage unit 48 (second storage unit) stores temporal transition of the maximum value estimated value Vme computed by voltage maximum value computing unit 46. During normal operation, the maximum value estimated value Vme is kept to an almost constant value. On the other hand, when a power failure occurs in AC power source 1, the maximum value estimated value Vme gradually decreases as shown in FIG. 2.

Power-failure voltage maximum value transition storage unit 50 (first storage unit) is configured to store temporal transition of the maximum value Vm of AC input voltage when AC power source 1 undergoes a simulated power failure.

Specifically, when the power is turned on in a state in which uninterruptible power supply device 100 is connected between AC power source 1 and load 11, a simulated power failure test is carried out prior to activation of uninterruptible power supply device 100. In the simulated power failure test, a breaker (not shown) connected between AC power source 1 and input terminal T1 is opened to create a power failure state of AC power source 1 intentionally. Then, in this simulated power failure state, power-failure voltage maximum value transition storage unit 50 detects the actual measured value of the maximum value Vm of AC input voltage and stores temporal transition of the detected actual measured value of the maximum value Vm.

Figure 5:
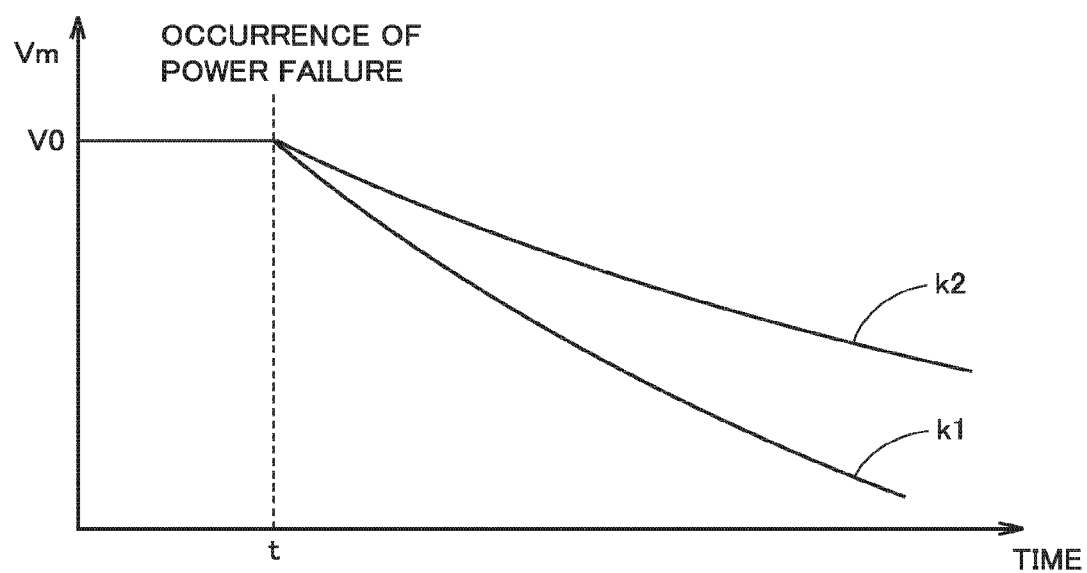
FIG. 5 is a diagram showing an example of temporal transition of the maximum value of AC input voltage during simulated power failure.

FIG. 5 is a diagram showing an example of temporal transition of the maximum value of AC input voltage during simulated power failure.

Referring to FIG. 5, it is assumed that a simulated power failure is generated at time t. Before time t, the maximum value Vm of AC input voltage is constant (Vm=V0). V0 is the maximum value Vm of AC input voltage during normal operation.

At time t, the breaker is opened and a power failure is generated, and after time t, the maximum value Vm of AC input voltage gradually decreases from V0.

The amount of decrease of the maximum value Vm per unit time (hereinafter also referred to as "maximum value decrease rate") varies depending on the magnitude of impedance (system impedance) of the current-carrying path from the opened breaker to input terminal T1. FIG. 5 shows two waveforms 1, k2 having maximum value decrease rates (that is, the inclinations of waveforms) different from each other. In these two waveforms k1, k2, the waveform k1 has a larger maximum value decrease rate (inclination) compared with the waveform k2, because the system impedance is relatively small.

In a case where a plurality of breakers are installed between AC power source 1 and input terminal T1, when the breaker installed closest to input terminal T1 is opened, the system impedance is smallest and consequently the maximum value decrease rate is largest. Therefore, the degree of effect on load 11 is larger than when the other breakers are opened. In the simulated power failure test, for example, a breaker with a large degree of effect on load 11 (that is, the breaker closest to input terminal T1) can be opened.

In the present embodiment, temporal transition of the maximum value Vm of AC input voltage when a power failure actually occurs in AC power source 1 can be obtained in advance by carrying out a simulated power failure test. That is, it is possible to obtain in advance the maximum value decrease rate at which the maximum value Vm decreases when a power failure actually occurs. Thus, it can be determined whether a power failure occurs in AC power source 1 by comparing temporal transition of the maximum value estimated value Vme obtained during the commercial power supply mode with temporal transition of the actual measured value of the maximum value Vm during simulated power failure. The actual measured value of the maximum value Vm during simulated power failure may be hereinafter referred to as "the power-failure maximum value Vmi".

Figure 6:
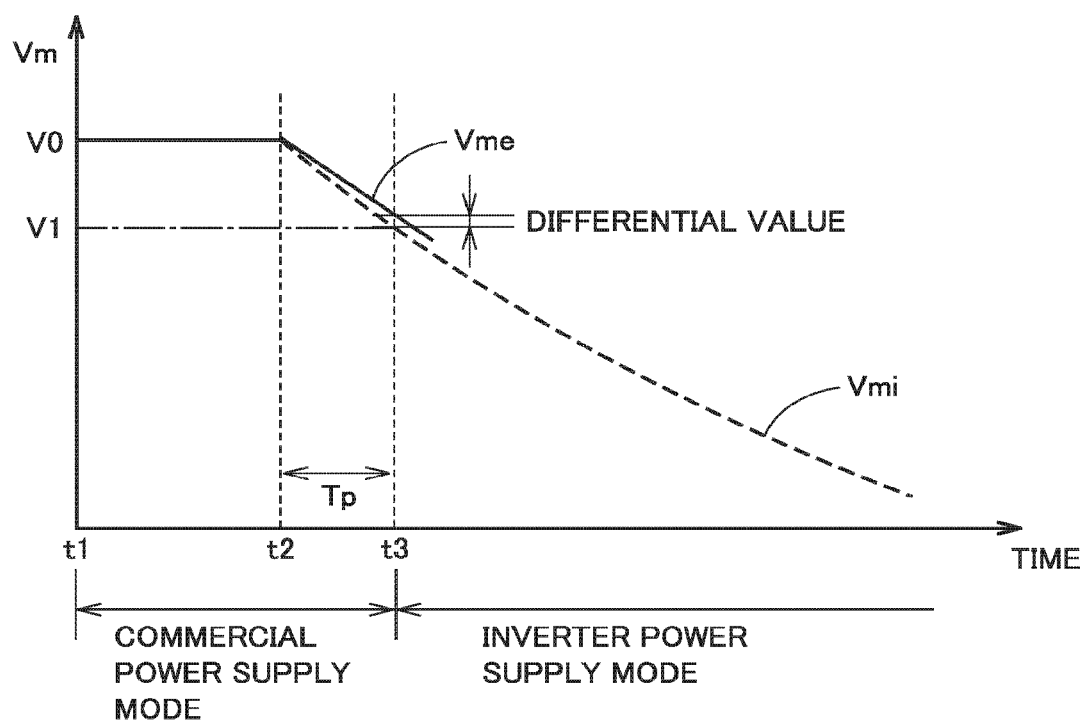
FIG. 6 is a diagram showing an example of temporal transition of the maximum value estimated value read from a voltage maximum value transition storage unit.

Specifically, returning to FIG. 3, in comparison unit 52, temporal transition of the power-failure maximum value Vmi read from power-failure voltage maximum value transition storage unit 50 is compared with temporal transition of the maximum value estimated value Vme read from voltage maximum value transition storage unit 48. FIG. 6 is a diagram showing an example of temporal transition of the maximum value estimated value Vme read from voltage maximum value transition storage unit 48. The solid line in FIG. 6 shows temporal transition of the maximum value estimated value Vme, and the dashed line in FIG. 6 shows temporal transition of the power-failure maximum value Vmi. The temporal transition of the power-failure maximum value Vmi shown in FIG. 6 corresponds to the waveform k1 in FIG. 5.

Referring to FIG. 6, after time t1, uninterruptible power supply device 100 executes the commercial power supply mode. The maximum value estimated value Vme calculated from the instantaneous value v and the phase $\theta$ of AC input voltage is kept at V0.

It is assumed that the maximum value estimated value Vme starts decreasing from V0, at time t2. Comparison unit 52 compares the temporal transition of the maximum value estimated value Vme after time t2 with the temporal transition of the power-failure maximum value Vmi.

Specifically, comparison unit 52 has a determination value V1 for determining whether a power failure has occurred in AC power source 1. Determination value V1 is set to, for example, a magnitude of about 90% of V0 that is the maximum value Vm during normal operation. Comparison unit 52 acquires the elapsed time Tp until the power-failure maximum value Vmi decrease to the determination value V1 from V0, and then acquires the maximum value estimated value Vme at time t3 after the elapse of Tp since time t2. Comparison unit 52 calculates a differential value between the maximum value estimated value Vme at time t3 and the determination value V1.

Determination unit 54 determines whether the temporal transition of the maximum value estimated value Vme after time t2 matches the temporal transition of the power-failure maximum value Vmi, based on the magnitude of the differential value calculated by comparison unit 52. Specifically, if the differential value at time t3 is equal to or smaller than a predetermined threshold d1, determination unit 54 determines that the temporal transition of the maximum value estimated value Vme after time t2 matches the temporal transition of the power-failure maximum value Vmi. In this case, determination unit 54 determines that a power failure occurs in AC power source 1.

On the other hand, if the differential value at time t3 is greater than the predetermined threshold d1, determination unit 54 determines that the temporal transition of the maximum value estimated value Vme after time t2 does not match the temporal transition of the power-failure maximum value Vmi. In this case, determination unit 54 determines that a power failure does not occur in AC power source 1. Determination unit 54 outputs a signal indicating the determination result to power source monitoring unit 56.

Power source monitoring unit 56 transmits the signal from determination unit 54 to operation mode switch command generating unit 26. Operation mode switch command generating unit 26 selects one of the commercial power supply mode and the inverter power supply mode, based on the output signal of power source monitoring unit 56.

Here, in the present embodiment, the maximum value Vm of AC input voltage for use in detection of a power failure of AC power source 1 is the one estimated from the instantaneous value v and the phase $\theta$ of AC input voltage (maximum value estimated value Vme). In other words, a power failure of AC power source 1 can be detected without actually measuring the maximum value Vm of AC input voltage. Therefore, a power failure of AC power source 1 can be detected without waiting for a half cycle period. Accordingly, a power failure of AC power source 1 can be detected faster than the common detection method described above to enable switching to the inverter power supply mode. As a result, occurrence of an instantaneous voltage drop can be prevented during the transition from the commercial power supply mode to the inverter power supply mode.

Furthermore, a power failure of AC power source 1 is detected by comparing the temporal transition of the maximum value estimated value Vme with the temporal transition of the maximum value Vm of AC input voltage during simulated power failure (the power-failure maximum value Vmi). This enables accurate detection of a power failure of AC power source 1.

That is, in uninterruptible power supply device 100 according to the present embodiment, a power failure of AC power source 1 is detected fast and accurately to enable a transition from the commercial power supply mode to the inverter power supply mode. This can improve the reliability of uninterruptible power supply device 100. Therefore, as long as a power failure of AC power source 1 is not detected, uninterruptible power supply device 100 can be kept executing the commercial power supply mode, thereby achieving high efficiency of uninterruptible power supply device 100.

(Switching of Operation Modes)

The switching of operation modes of uninterruptible power supply device 100 when a power failure of AC power source 1 is detected will be described below. The switching of operation modes when supply of AC power from AC power source 1 is resumed, that is, during power restoration will also be described.

(1) In Detection of Power Failure of AC Power Source 1

When a power failure of AC power source 1 is detected by the method described above, operation mode switch command generating unit 26 switches the commercial power supply command from ON to OFF and also switches the inverter power supply command from OFF to ON.

When the inverter power supply command is switched ON, inverter control unit 30 outputs a gate signal generated by PWM control during the commercial power supply mode to the gate drive circuit in inverter 7. Inverter 7 converts DC power stored in storage battery 14 into AC power. Inverter 7 thus outputs AC voltage synchronized with the AC voltage supplied from AC power source 1 before occurrence of the power failure.

When the inverter power supply command is switched ON, converter control unit 28 stops the operation of converter 5.

When the inverter power supply command is switched ON, switch control unit 32 turns on thyristor switch 12 and turns on contactor 10. The response time of thyristor switch 12 is short and, upon receiving an ON command, thyristor switch 12 instantaneously turns on. On the other hand, the response time of contactor 10 is longer than the response time of thyristor switch 12, and contactor 10 turns on after the elapse of a predetermined response time since the ON command is received. Thus, the AC voltage output from inverter 7 is supplied to output terminal T2. After contactor 10 is turned on, switch control unit 32 turns off contactor 13. Further, after contactor 13 is turned off, switch control unit 32 turns off thyristor switch 12. This allows uninterruptible power supply device 100 to make a transition from the commercial power supply mode to the inverter power supply mode without instantaneous interruption.

(2) In Power Restoration of AC Power Source 1

During the inverter power supply mode, power source abnormality detecting unit 36 determines whether AC power source 1 is restored. Specifically, during the inverter power supply mode, power source monitoring unit 56 monitors the waveform of AC input voltage, based on the detected values of voltage instantaneous value detecting unit 40 and voltage phase detecting unit 42. When the maximum value Vm of AC input voltage is equal to or greater than a determination value V1, power source abnormality detecting unit 36 determines that AC power source 1 is restored.

During the inverter power supply mode, inverter 7 outputs AC voltage synchronized with the AC voltage supplied from AC power source 1 before occurrence of the power failure to output terminal T2. On the other hand, the phase of the AC voltage supplied from AC power source 1 may be shifted between before occurrence of the power failure and after power restoration. In this case, if the inverter power supply mode returns to the commercial power supply mode, the AC voltage output to output terminal T2 may fluctuate to affect the operation of load 11.

Then, when power restoration of AC power source 1 is detected, inverter control unit 30 gradually synchronizes the AC voltage output from inverter 7 with the AC voltage supplied from AC power source 1 after power restoration. Specifically, inverter control unit 30 limits the amount of change of the voltage command value for a control period in PWM control to a predetermined upper limit value or smaller. This upper limit value is adapted, for example, by experiments so as not to affect the operation of load 11.

Inverter control unit 30 determines whether the AC voltage output from inverter 7 becomes synchronized with the AC voltage supplied from AC power source 1 after power restoration. Specifically, inverter control unit 30 compares the AC voltage output from inverter 7 with a predetermined normal fluctuation range.

Figure 7:
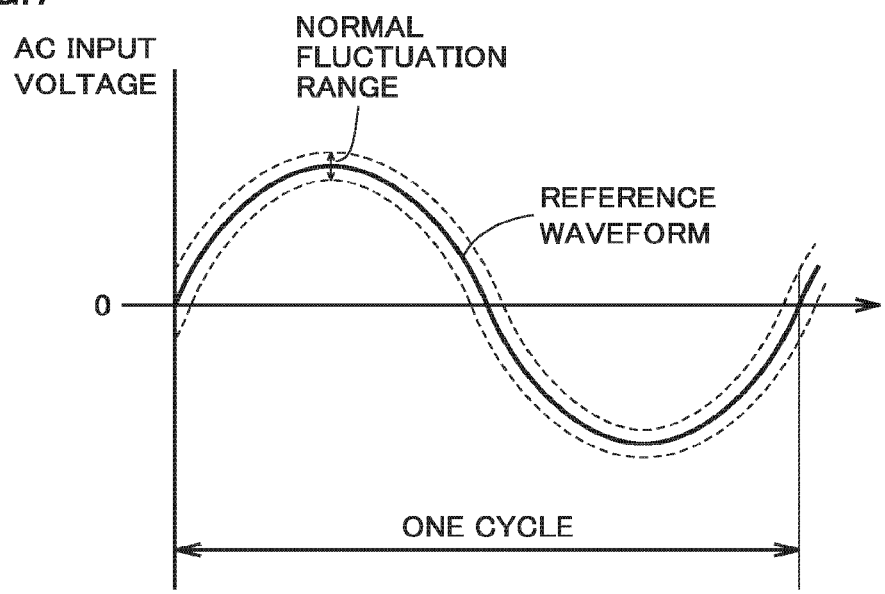
FIG. 7 is a diagram illustrating a normal fluctuation range.

FIG. 7 is a diagram illustrating a normal fluctuation range. Referring to FIG. 7, the waveform of AC input voltage after power restoration that is drawn with the values detected by voltage instantaneous value detecting unit 40 and voltage phase detecting unit 42 is set as a reference waveform, and a predetermined voltage width including this reference waveform at the center is set as a normal fluctuation range. When the AC voltage output from inverter 7 falls within the normal fluctuation range shown in FIG. 7, inverter control unit 30 determines that the AC voltage output from inverter 7 becomes synchronized with the AC voltage supplied from AC power source 1 after power restoration. Inverter control unit 30 outputs a signal indicating the determination result to operation mode switch command generating unit 26.

When the AC voltage output from inverter 7 becomes synchronized with the AC voltage supplied from AC power source 1 after power restoration, operation mode switch command generating unit 26 switches the commercial power supply command from ON to OFF and switches the inverter power supply command from ON to OFF.

When the commercial power supply command is switched ON, switch control unit 32 turns on thyristor switch 12 and turns on contactor 13. After contactor 13 is turned on, switch control unit 32 turns off contactor 10. Furthermore, after contactor 10 is turned off, switch control unit 32 turns off thyristor switch 12. This allows uninterruptible power supply device 100 to make a transition from the inverter power supply mode to the commercial power supply mode without instantaneous interruption.

Inverter control unit 30 stops output of a gate signal to the gate drive circuit in inverter 7 to stop the operation of inverter 7. This allows uninterruptible power supply device 100 to return to the commercial power supply mode. After returning to the commercial power supply mode, inverter control unit 30 generates a gate signal for turning on/off the semiconductor switching element included in inverter 7 by PWM control. Inverter control unit 30, however, does not output the generated gate signal to the gate drive circuit. Inverter 7 thus enters a gate signal input-waiting state again.

When the commercial power supply command is switched ON, converter control unit 28 activates converter 5. Converter control unit 28 generates a gate signal for controlling the power conversion in converter 5 and outputs the generated gate signal to converter 5. Converter 5 thus converts the AC power supplied from AC power source 1 after power restoration into DC power to supply storage battery 14.

(Flowchart)

Figure 8:
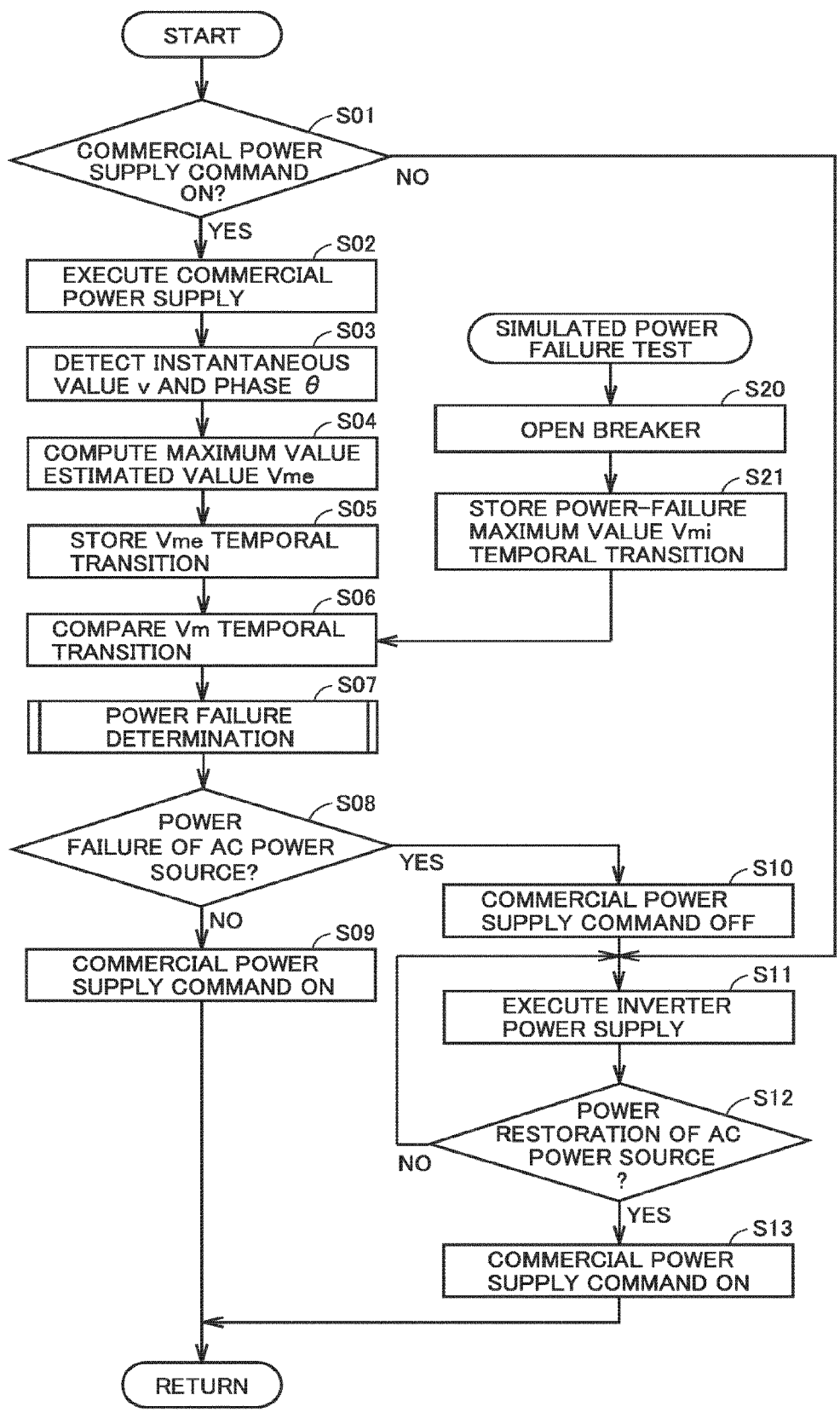
FIG. 8 is a flowchart for explaining the procedure of operation mode switching control in the uninterruptible power supply device according to the first embodiment.

FIG. 8 is a flowchart for explaining the procedure of operation mode switching control in the uninterruptible power supply device according to the first embodiment.

Referring to FIG. 8, control device 20 determines whether the commercial power supply command is ON (step S01) If the commercial power supply command is ON (the determination is YES in S01), control device 20 controls uninterruptible power supply device 100 such that uninterruptible power supply device 100 executes the commercial power supply mode (step S02). Specifically, control device 20 turns on contactor 13 and turns off contactor 10. When contactor 13 is turned on, control device 20 turns on thyristor switch 12 for a predetermined time. Control device 20 further brings inverter 7 into a gate signal input-waiting state.

During the commercial power supply mode, control device 20 detects the instantaneous value v and the phase θ of AC input voltage (step S03) and computes the maximum value estimated value Vme based on these detected values (step S04). Control device 20 stores the temporal transition of the maximum value estimated value Vme (step S05).

Control device 20 carries out a simulated power failure test before uninterruptible power supply device 100 is activated. Specifically, a breaker connected between AC power source 1 and input terminal T1 is opened (step S20). In a simulated power failure state of AC power source 1, control device 20 detects the actual measured value of the maximum value Vm of AC input voltage (the power-failure maximum value Vmi) and stores the temporal transition of the detected power-failure maximum value Vmi (step S21).

Control device 20 compares the temporal transition of the maximum value estimated value Vme stored in step S05 with the temporal transition of the power-failure maximum value Vmi stored in step S21 (step S06). Control device 20 determines whether a power failure has occurred in AC power source 1, based on the comparison result (step S07).

Figure 9:
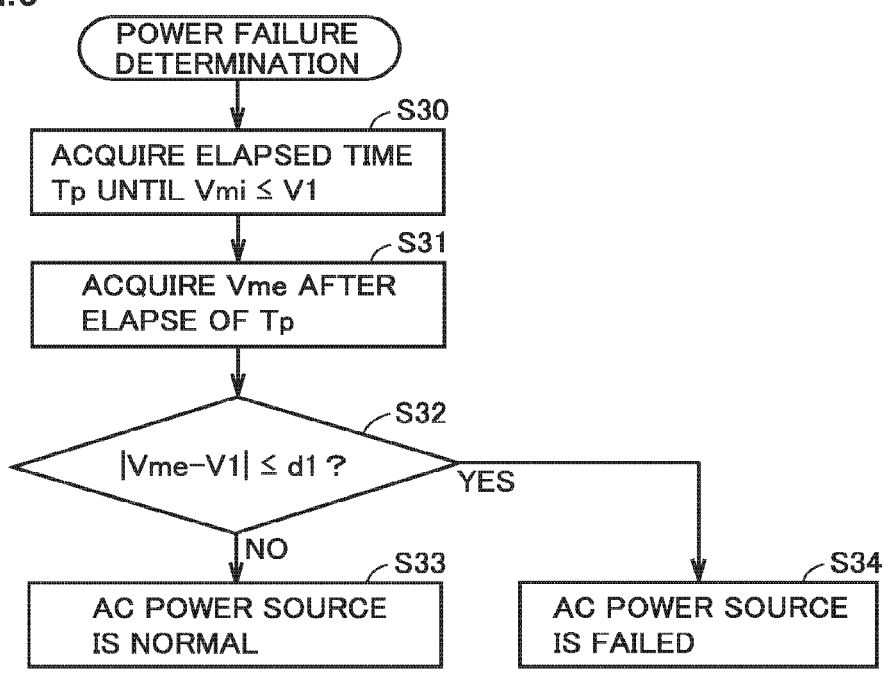
FIG. 9 is a flowchart for explaining the procedure of a power failure determination process in step S07 in FIG. 8.

FIG. 9 is a flowchart for explaining the procedure of the power failure determination process in step S07 in FIG. 8. Referring to FIG. 9, control device 20 acquires the elapsed time Tp until the power-failure maximum value Vmi decreases from V0 (the maximum value Vm during normal operation) to the determination value V1, based on the temporal transition of the power-failure maximum value Vmi (step S30). Subsequently, control device 20 acquires the maximum value estimated value Vme after the elapse of Tp since the time when the maximum value estimated value Vme starts decreasing from V0 (step S31).

Control device 20 calculates a differential value (=|Vme−V1|) between the maximum value estimated value Vme acquired in step S31 and the determination value V1 and compares the differential value with a predetermined threshold d1 (step S32). If the differential value is greater than the threshold d1 (the determination is NO in S32), control device 20 determines that AC power is supplied normally from AC power source 1 (step S33). On the other hand, when the differential value is equal to or smaller than the threshold d1 (the determination is YES in S32), control device 20 determines that a power failure occurs in AC power source 1 (step S34).

Returning to FIG. 8, if AC power is supplied normally from AC power source 1 (the determination is NO in S08), control device 20 sets the commercial power supply command ON (sets the inverter power supply command OFF) (step S09). This allows uninterruptible power supply device 100 to keep executing the commercial power supply mode.

On the other hand, if a power failure of AC power source 1 is detected (the determination is YES in S08), control device 20 sets the commercial power supply command OFF (sets the inverter power supply command ON) (step S10). Control device 20 controls uninterruptible power supply device 100 such that uninterruptible power supply device 100 executes the inverter power supply mode (step S11). Specifically, control device 20 activates inverter 7 and controls inverter 7 such that the AC voltage output from inverter 7 is synchronized with the AC voltage supplied from AC power source 1 before occurrence of the power failure. Furthermore, control device 20 turns on contactor 10 and turns off contactor 13. When contactor 10 is turned on, control device 20 turns on thyristor switch 12 for a predetermined time.

During the inverter power supply mode, control device 20 determines whether AC power source 1 has been restored, based on the detected values of the instantaneous value v and the phase θ of AC input voltage (step S12). When the maximum value Vm of AC input voltage is equal to or greater than the determination value V1, control device 20 determines that AC power source 1 has been restored (the determination is YES in S12). On the other hand, if it is determined that AC power source 1 has not been restored (the determination is NO in S12), the process returns to step S11, and uninterruptible power supply device 100 keeps executing the inverter power supply mode.

When power restoration of AC power source 1 is detected, control device 20 gradually synchronizes the AC voltage output from inverter 7 with the AC voltage supplied from AC power source 1 after power restoration. When the AC voltage output from inverter 7 falls within the normal fluctuation range set based on the AC voltage supplied from AC power source 1 after power restoration, control device 20 determines that the AC voltage output from inverter 7 has become synchronized with the AC voltage supplied from AC power source 1 after power restoration, and sets the commercial power supply command ON (sets the inverter power supply command OFF) (step S13).

When the commercial power supply command is set ON, control device 20 turns on contactor 13 and turns off contactor 10. When contactor 13 is turned on, control device 20 turns on thyristor switch 12 for a predetermined time.

As described above, the uninterruptible power supply device according to the first embodiment determines whether a power failure has occurred in the AC power source, based on the maximum value Vm estimated from the instantaneous value v and the phase θ of AC input voltage (maximum value estimated value Vme) and therefore can detect a power failure of the AC power source faster than the configuration of determining based on the actual measured value of the maximum value Vm.

Furthermore, a simulated power failure test is carried out to acquire temporal transition of the maximum value Vm of AC input voltage during power failure (the power-failure maximum value Vmi) in advance, and the power-failure maximum value Vmi is compared with the temporal transition of the maximum value estimated value Vme. This enables accurate detection of a power failure of the AC power source.

As a result, when a power failure of the AC power source occurs during the commercial power supply mode, the uninterruptible power supply device according to the first embodiment can switch to the inverter power supply mode promptly after occurrence of the power failure. This can prevent occurrence of an instantaneous voltage drop during the transition from the commercial power supply mode to the inverter power supply mode. That is, the reliability of the uninterruptible power supply device can be improved, so that the uninterruptible power supply device can be kept executing the commercial power supply mode as long as a power failure of the AC power source is not detected. Consequently, high efficiency of the uninterruptible power supply device can be achieved.

Second Embodiment

In a simulated power failure test, the breaker connected between AC power source 1 and input terminal T1 is opened to create a power failure state of AC power source 1 intentionally, and the temporal transition of the maximum value Vm of AC input voltage at that time (the power-failure maximum value Vmi) is acquired.

However, when the breaker opened during the commercial power supply mode is located closer to the AC power source 1 than the breaker opened in the simulated power failure test, the maximum value Vm gradually decreases at the maximum value change rate lower than the power-failure maximum value Vmi. Even in such a case, it is necessary to switch to the inverter power supply mode.

On the other hand, since the power loss is larger in the inverter power supply mode than in the commercial power supply mode, it is desirable to keep executing the commercial power supply mode as long as an instantaneous voltage drop does not occur, for the purpose of high efficiency.

Then, in the uninterruptible power supply device according to a second embodiment, when there is a possibility that a power failure occurs in AC power source 1 during the commercial power supply mode, a transition to the inverter power supply mode is prepared while the commercial power supply mode is continued. This enables a transition to the inverter power supply mode promptly when a power failure of AC power source 1 is detected.

Figure 10:
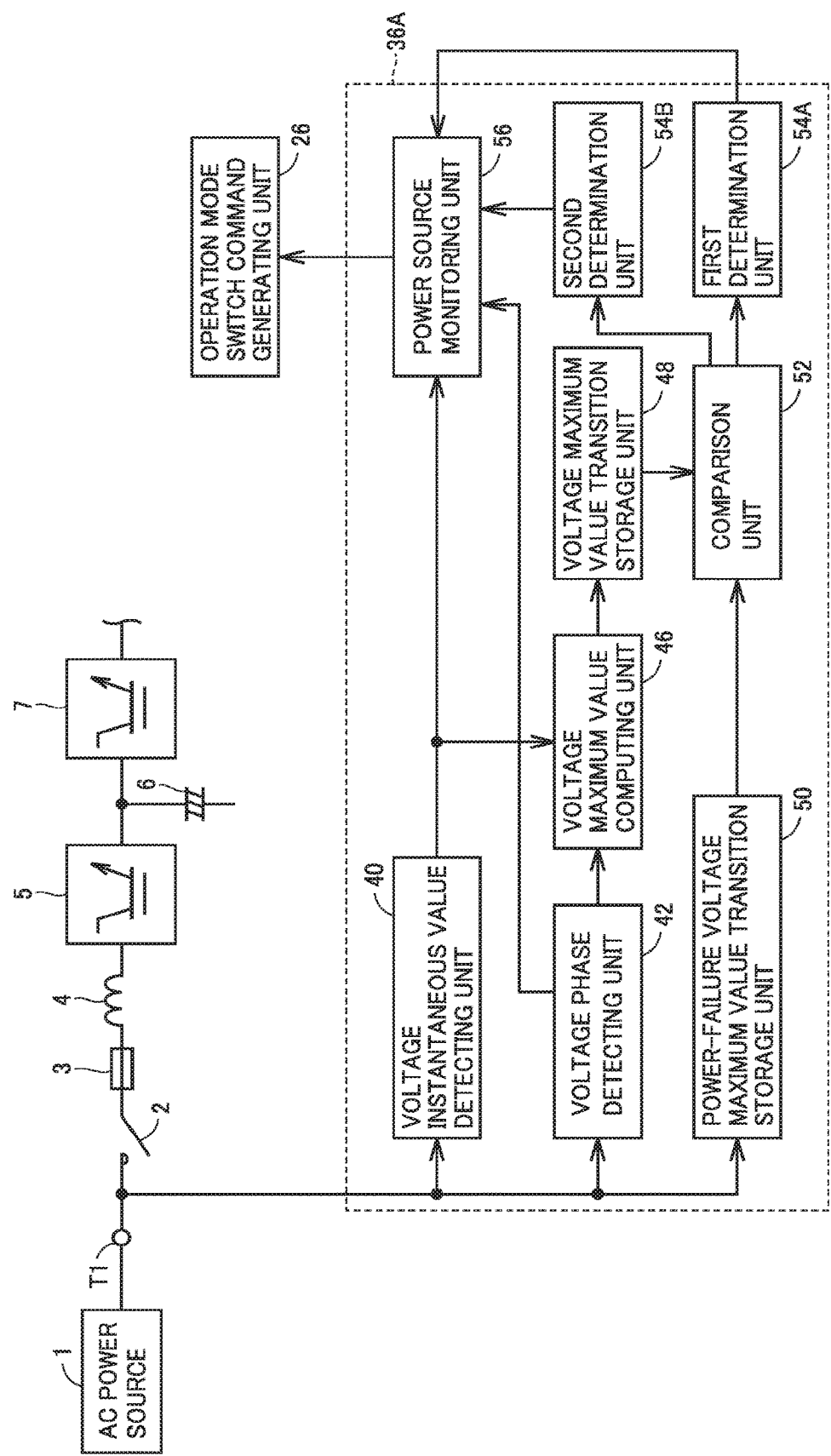
FIG. 10 is a functional block diagram showing a control configuration of the power source abnormality detecting unit in the uninterruptible power supply device according to a second embodiment.

The uninterruptible power supply device according to the second embodiment basically includes a configuration similar to uninterruptible power supply device 100 shown in FIG. 1 but differs in that it includes a power source abnormality detecting unit 36A shown in FIG. 10 in place of power source abnormality detecting unit 36.

Referring to FIG. 10, power source abnormality detecting unit 36A according to the second embodiment includes determination units 54A, 54B in place of determination unit 54 in power source abnormality detecting unit 36 shown in FIG. 3.

First determination unit 54A determines whether a power failure occurs in AC power source 1, based on the comparison between the temporal transition of the maximum value estimated value Vme and the temporal transition of the power-failure maximum value Vmi, in the same manner as in determination unit 54 shown in FIG. 3.

First determination unit 54A further determines whether there is a possibility that a power failure occurs in AC power source 1, based on the comparison. The possibility that a power failure occurs in AC power source 1 means a possibility that the maximum value Vm decreases to the determination value V1 or smaller although the maximum value decrease rate is small compared with the maximum value Vm during simulated power failure.

When first determination unit 54A determines that there is a possibility that a power failure occurs in AC power source 1, second determination unit 54B determines whether a power failure occurs in AC power source 1, based on the temporal transition of the maximum value estimated value Vme. Second determination unit 54B is provided for determining whether a decrease of the maximum value Vm is caused by a power failure of AC power source 1 or caused by a temporary fluctuation of the load.

Figure 11:
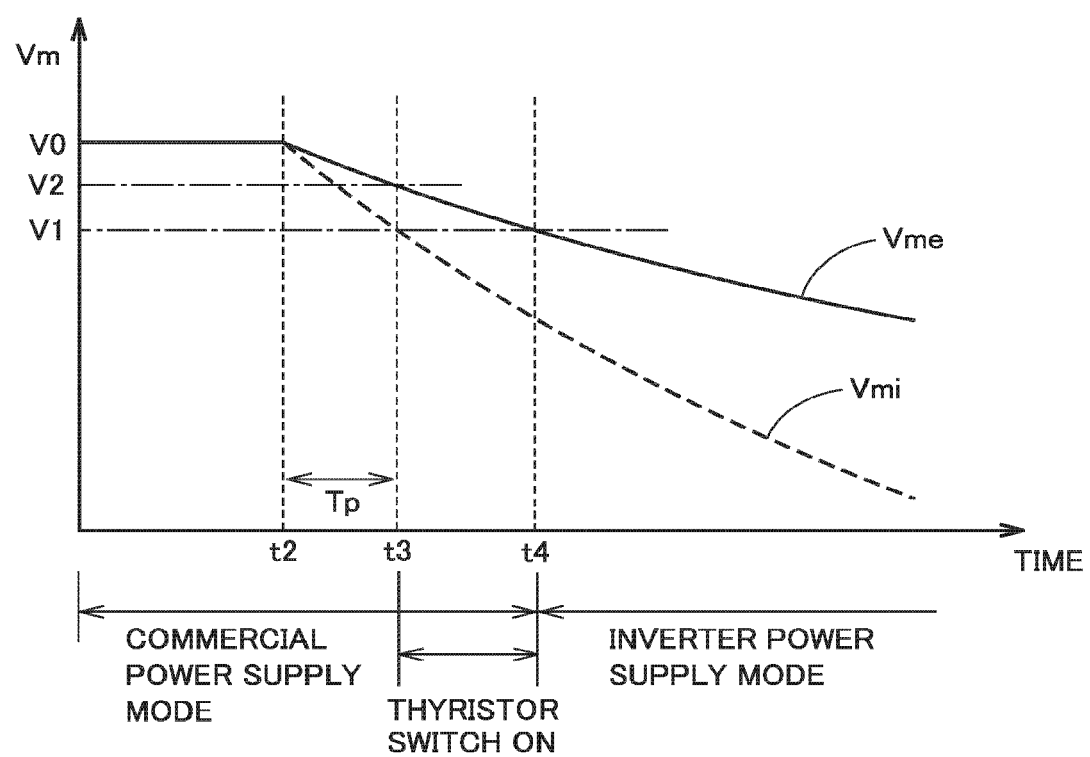
FIG. 11 is a diagram showing an example of temporal transition of the maximum value estimated value read from the voltage maximum value transition storage unit.

In the uninterruptible power supply device according to the second embodiment, the commercial power supply mode and the inverter power supply mode are switched based on the determination result of determination units 54A, 54B. Referring to FIG. 11, the switching of the operation modes in the uninterruptible power supply device according to the second embodiment will be described.

FIG. 11 is a diagram showing an example of temporal transition of the maximum value estimated value Vme read from voltage maximum value transition storage unit 48. The solid line in FIG. 11 shows temporal transition of the maximum value estimated value Vme, and the dashed line in FIG. 11 shows temporal transition of the power-failure maximum value Vmi. The temporal transition of the power-failure maximum value Vmi shown in FIG. 11 corresponds to the waveform k1 in FIG. 5.

Referring to FIG. 11, after time t1, uninterruptible power supply device 100 executes the commercial power supply mode. The maximum value estimated value Vme calculated from the instantaneous value v and the phase θ of AC input voltage is kept at V0.

It is assumed that the maximum value estimated value Vme starts decreasing from V0, at time t2. Comparison unit 52 compares the temporal transition of the maximum value estimated value Vme after time t2 with the temporal transition of the power-failure maximum value Vmi. Specifically, when the elapsed time Tp until the power-failure maximum value Vmi decreases to the determination value V1 from V0 is acquired, comparison unit 52 acquires the maximum value estimated value Vme at time t3 after the elapse of Tp since time t2. Comparison unit 52 calculates a differential value between the maximum value estimated value Vme at time t3 and the determination value V1.

In first determination unit 54A, if the differential value at time t3 is equal to or smaller than the predetermined threshold d1, determination unit 54 determines that the temporal transition of the maximum value estimated value Vme after time t2 matches the temporal transition of the power-failure maximum value Vmi. In this case, first determination unit 54A determines that a power failure occurs in AC power source 1.

On the other hand, if the differential value at time t3 is greater than the threshold d1, first determination unit 54 determines whether the maximum value estimated value Vme at time t3 is equal to or smaller than the determination value V2. The determination value V2 is a determination value for determining whether there is a possibility that a power failure occurs in AC power source 1. The determination value V2 is greater than the determination value V1 and, for example, set to the magnitude of about 95% of V0 that is the maximum value Vm during normal operation.

If the maximum value estimated value Vme at time t3 is equal to or smaller than the determination value V2, first determination unit 54A determines that there is a possibility that a power failure occurs in AC power source 1. First determination unit 54A outputs a signal indicating the determination result to power source monitoring unit 56.

Power source monitoring unit 56 transmits the signal from first determination unit 54A to operation mode switch command generating unit 26. Operation mode switch command generating unit 26 selects one of the commercial power supply mode and the inverter power supply mode, based on the output signal of power source monitoring unit 56.

If first determination unit MA determines that a power failure occurs in AC power source 1, operation mode switch command generating unit 26 sets the commercial power supply command OFF (sets the inverter power supply command ON). Uninterruptible power supply device 100 is thus controlled to execute the inverter power supply mode, as explained with reference to FIG. 6. Specifically, switch control unit 32 turns on contactor 10 and turns off contactor 13. When contactor 10 is turned on, control device 20 turns on thyristor switch 12 for a predetermined time. Inverter control unit 30 activates inverter 7 and controls inverter 7 such that the AC voltage output from inverter 7 is synchronized with the AC voltage supplied from AC power source 1 before occurrence of the power failure.

By contrast, if first determination unit 54A determines that there is a possibility that a power failure of AC power source 1 occurs, operation mode switch command generating unit 26 turns on the commercial power supply command (turns off the inverter power supply command). In this case, switch control unit 32 turns on thyristor switch 12 and turns off contactor 13. On the other hand, switch control unit 32 still sets contactor 10 ON.

Accordingly, as shown in FIG. 11, uninterruptible power supply device 100 is in the commercial power supply mode even after time t3 and supplies the AC power supplied from AC power source 1 to load 11 through thyristor switch 12.

Second determination unit 54B determines whether the maximum value estimated value Vme decreases to the determination value V1 or smaller after time t3. If the maximum value estimated value Vme becomes the determination value V1 or smaller at time t4 subsequent to time t3, second determination unit 54B determines that a power failure occurs in AC power source 1. If second determination unit 54B determines that a power failure occurs in AC power source 1, operation mode switch command generating unit 26 sets the commercial power supply command OFF (sets the inverter power supply command ON).

Uninterruptible power supply device 100 is thus controlled to execute the inverter power supply mode after time t4. Specifically, switch control unit 32 turns on contactor 10 and turns off thyristor switch 12. Inverter control unit 30 activates inverter 7 and controls inverter 7 such that the AC voltage output from inverter 7 is synchronized with the AC voltage supplied from AC power source 1 before occurrence of the power failure.

As described above, when it is determined that there is a possibility that a power failure occurs in AC power source 1 during the commercial power supply mode, thyristor switch 12 is turned on and contactor 13 is turned off, whereby the commercial power supply mode using thyristor switch 12 is executed. Then, when the maximum value estimated value Vme decreases to the determination value V1 or smaller after thyristor switch 12 is turned on, contactor 10 is turned on and thyristor switch 12 is turned off, whereby a transition is made from the commercial power supply mode to the inverter power supply mode.

(Flowchart)

Figure 12:
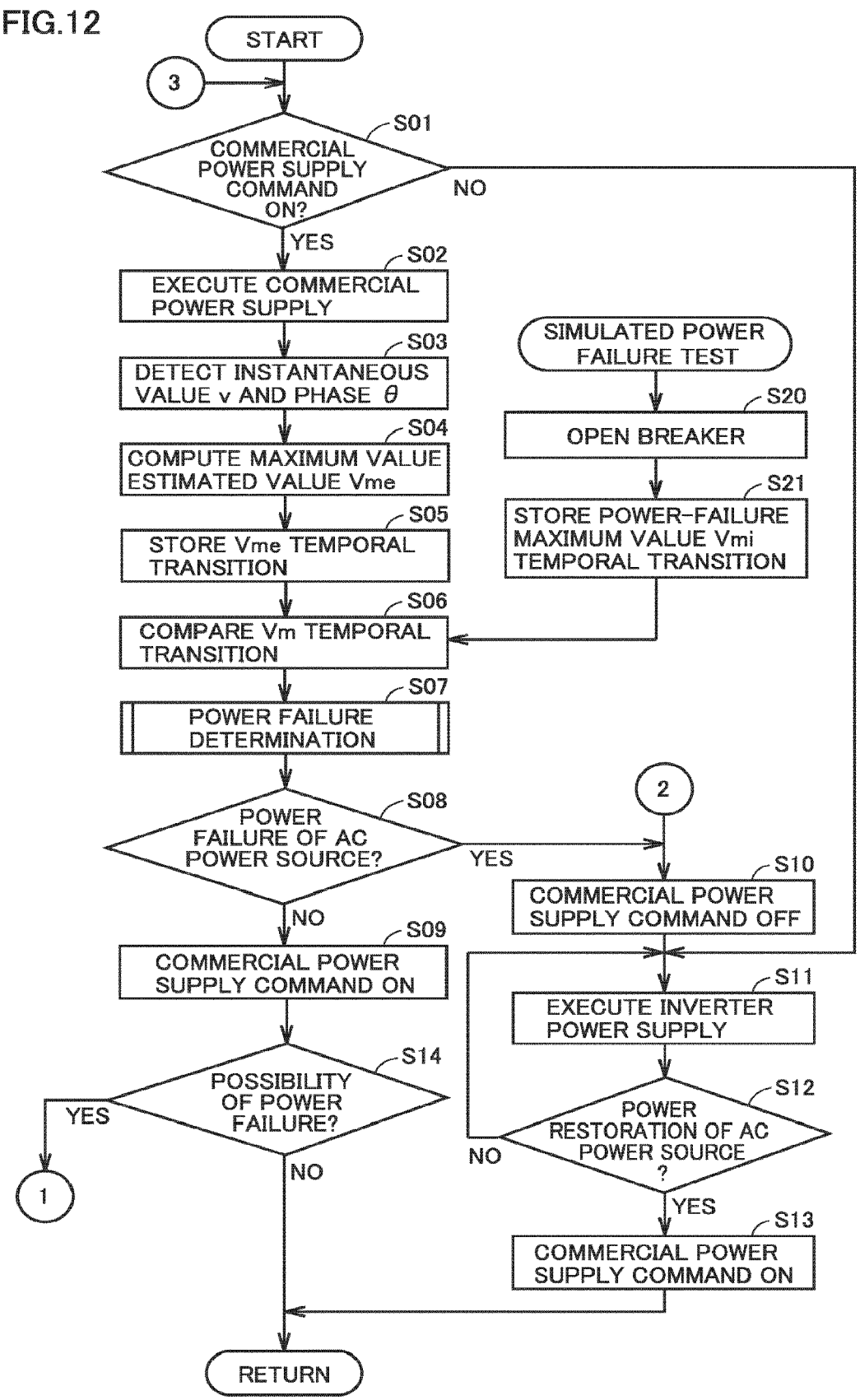
FIG. 12 is a flowchart for explaining the procedure of operation mode switching control in the uninterruptible power supply device according to the second embodiment.
Figure 13:
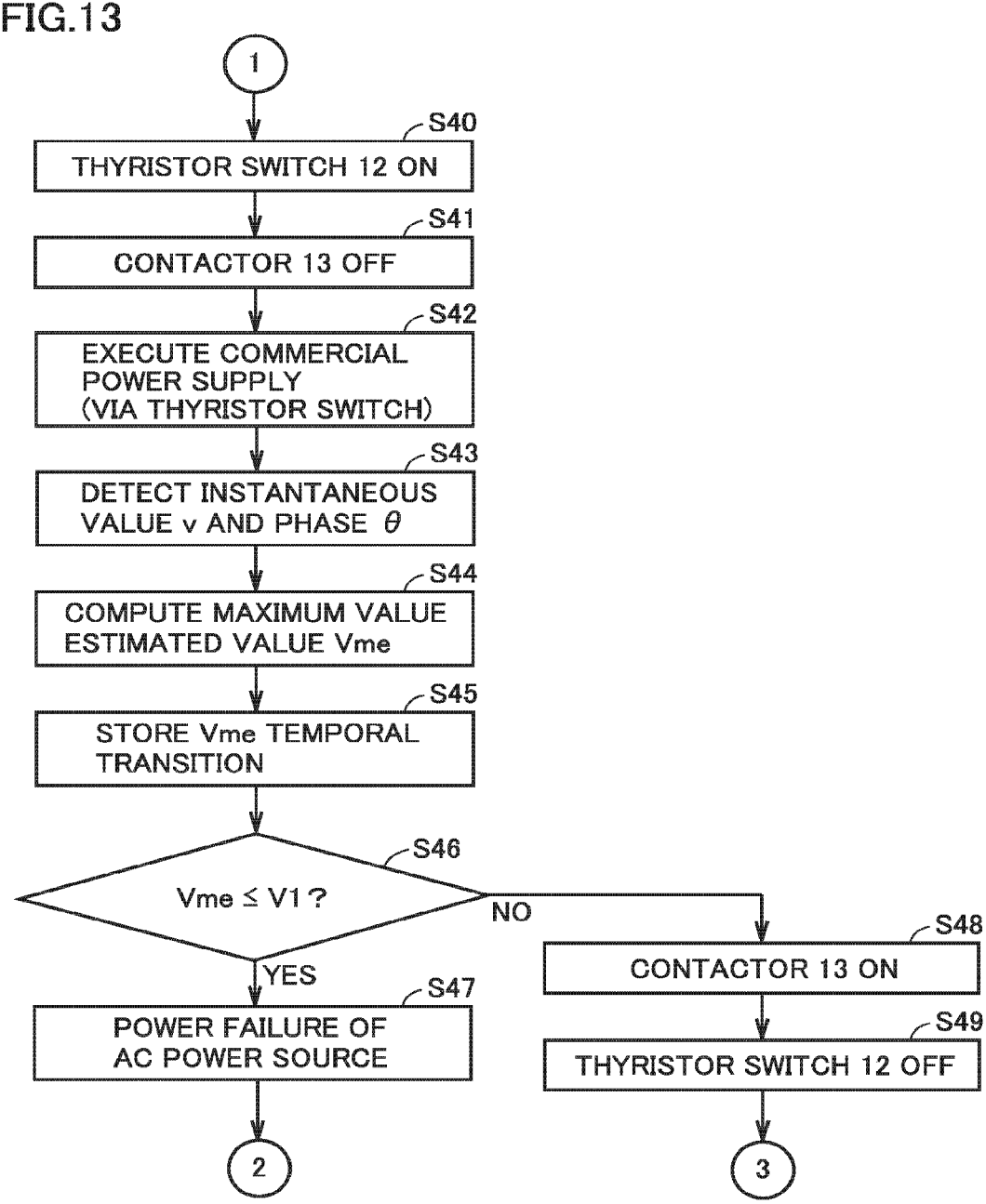
FIG. 13 is a flowchart for explaining the procedure of operation mode switching control in the uninterruptible power supply device according to the second embodiment.

FIG. 12 and FIG. 13 are flowcharts for explaining the procedure of operation mode switching control in the uninterruptible power supply device according to the second embodiment. The flowcharts shown in FIG. 12 and FIG. 13 additionally include step S14 and steps S40 to S49 in the flowchart shown in FIG. 8.

Referring to FIG. 12, if it is determined that a power failure does not occur in AC power source 1 (the determination is NO in S08), control device 20 sets the commercial power supply command ON (sets the inverter power supply command OFF) (step S09). This allows uninterruptible power supply device 100 to keep executing the commercial power supply mode.

Subsequently, control device 20 determines whether there is a possibility that a power failure occurs in AC power source 1 (step S14). If it is determined that there is a possibility that a power failure occurs in AC power source 1 (the determination is YES in S14), control device 20 turns on thyristor switch 12 (step S40) and turns off contactor 13 (step S41). This allows uninterruptible power supply device 100 to supply the AC power from AC power source 1 to load 11 through thyristor switch 12 (step S42).

During the commercial power supply mode using thyristor switch 12, control device 20 detects the instantaneous value v and the phase θ of AC input voltage (step S43) and computes the maximum value estimated value Vme based on these detected values (step S44). Control device 20 stores temporal transition of the maximum value estimated value Vme (step S45).

Control device 20 compares the maximum value estimated value Vme with the determination value V1 (step S46). If the maximum value estimated value Vme is equal to or smaller than the determination value V1 (the determination is YES in S46), control device 20 determines that a power failure occurs in AC power source 1 (step S47). In this case, returning to step S10 in FIG. 12, control device 20 sets the commercial power supply command OFF (sets the inverter power supply command ON). Control device 20 turns on contactor 10 and turns off thyristor switch 12 such that uninterruptible power supply device 100 executes the inverter power supply mode. Control device 20 further activates inverter 7 (step S11).

By contrast, if the maximum value estimated value Vme is greater than the determination value V1 (the determination is NO in S46), it is determined that there is no possibility that a power failure occurs in AC power source 1, that is, that AC power is supplied normally from AC power source 1. In this case, control device 20 turns on contactor 13 (step S48) and turns off thyristor switch 12 (step S49). This allows uninterruptible power supply device 100 to keep executing the commercial power supply mode.

As described above, uninterruptible power supply device 100 according to the second embodiment continuously executes the commercial power supply mode using thyristor switch 12 when there is a possibility that a power failure occurs in the AC power source, and thus can make a transition to the inverter power supply mode quickly without instantaneous interruption when it is determined that a power failure occurs in the AC power source. By doing so, the commercial power supply mode can be executed longer without impairing the reliability, compared with when a transition is made to the inverter power supply mode immediately when there is a possibility that a power failure occurs in the AC power source. Accordingly, high efficiency of the uninterruptible power supply device can be achieved.

Third Embodiment

The breaker opened during the commercial power supply mode may differ from the breaker opened in the simulated power failure test. In such a case, there is a mismatch between the temporal transition of the power-failure maximum value Vmi acquired in the simulated power failure test and the temporal transition of the maximum value estimated value Vme when a power failure actually occurs in AC power source 1. As a result, a power failure of AC power source 1 may be unable to be detected fast and accurately.

Then, in the uninterruptible power supply device according to a third embodiment, a plurality of temporal transitions of the power-failure maximum value Vmi with maximum value decrease rates different from each other are acquired in a simulated power failure test. This enables switching between temporal transitions of the power-failure maximum value Vmi for use in detection of a power failure of AC power source 1.

Figure 14:
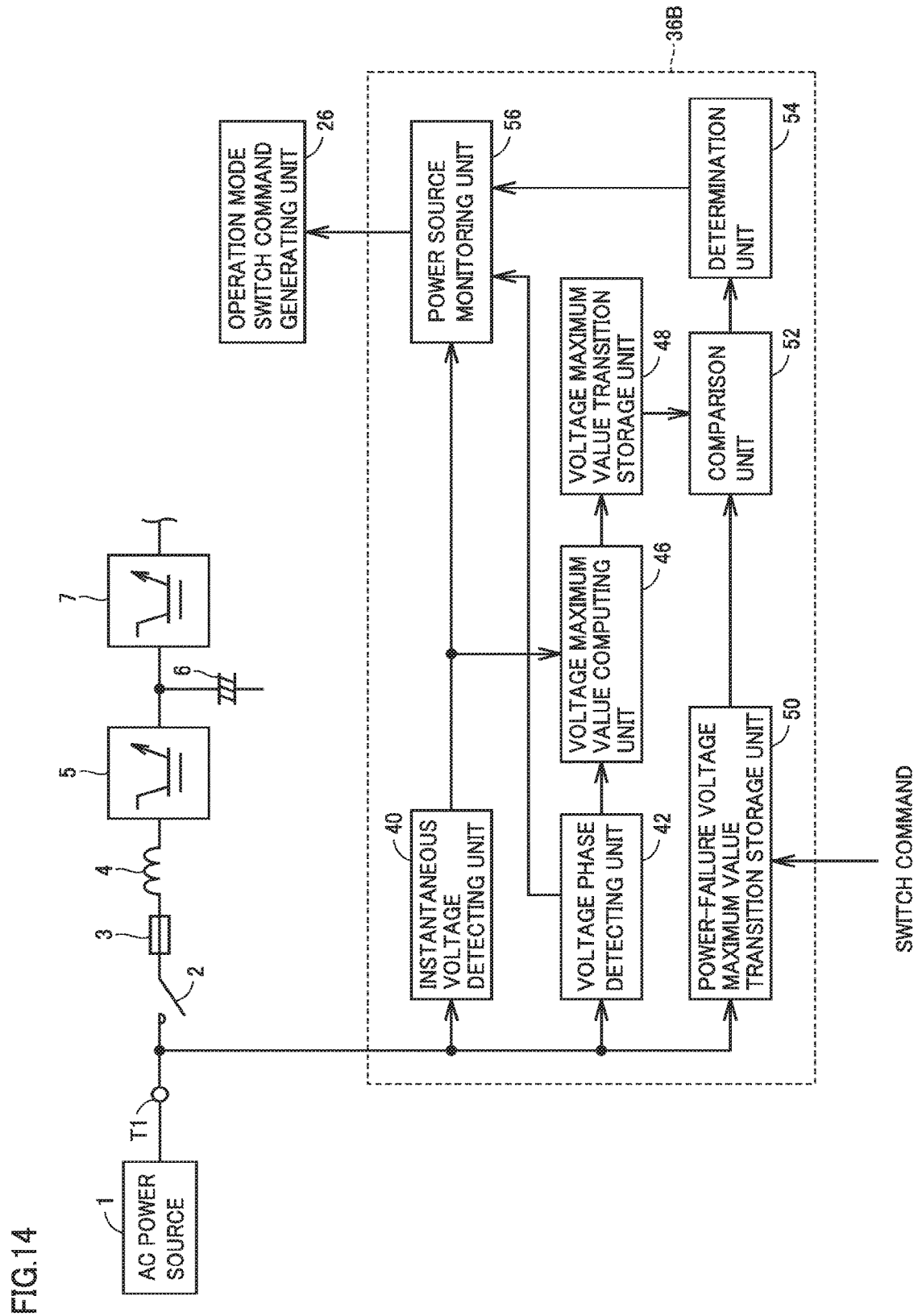
FIG. 14 is a functional block diagram showing a control configuration of the power source abnormality detecting unit in the uninterruptible power supply device according to a third embodiment.

The uninterruptible power supply device according to the third embodiment basically has a configuration similar to uninterruptible power supply device 100 shown in FIG. 1 but differs in that it includes a power source abnormality detecting unit 36B shown in FIG. 14 in place of power source abnormality detecting unit 36.

Figure 15:
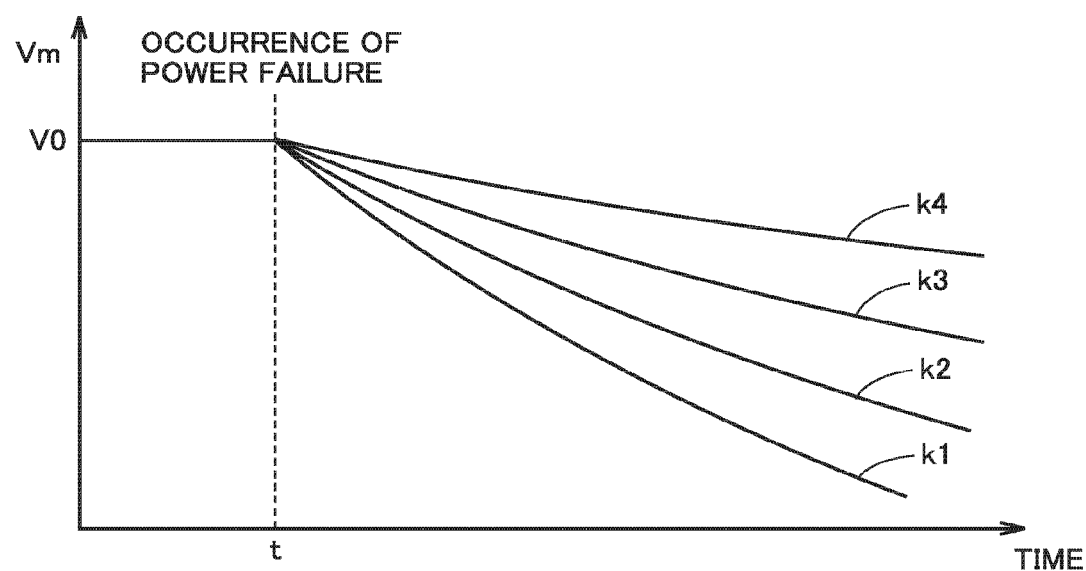
FIG. 15 is a diagram showing an example of temporal transitions of the maximum value during power failure stored in a power-failure voltage maximum value transition storage unit.

Referring to FIG. 14, in power source abnormality detecting unit 36B, power-failure voltage maximum value transition storage unit 50 stores a plurality of temporal transitions of the power-failure maximum value Vmi with the maximum value decrease rates different from each other. FIG. 15 is a diagram showing an example of temporal transitions of the power-failure maximum value Vmi stored in power-failure voltage maximum value transition storage unit 50. Referring to FIG. 15, when the breaker is opened and a power failure occurs at time t, the maximum value Vm of AC input voltage gradually decreases from V0 after time t.

In the example in FIG. 15, four waveforms k1 to k4 with maximum value decrease rates (that is, the inclinations of the waveforms) different from each other are shown. Of these four waveforms k1 to k4, the waveform k1 has the largest maximum value decrease rate (inclination) because the system impedance is smallest.

A plurality of temporal transitions of the power-failure maximum value Vmi shown in FIG. 15 can be acquired, for example, by selectively opening a plurality of breakers connected between AC power source 1 and input terminal T1, in a simulated power failure test. Alternatively, they may be created by simulation, based on the temporal transition of the maximum value acquired in a simulated power failure test.

Power-failure voltage maximum value transition storage unit 50 is given a switch command for switching the temporal transitions of the power-failure maximum value Vmi, from an upper-level control unit. This switch command can be issued, for example, by the user performing input operation to the uninterruptible power supply device when it is determined that the transition from the commercial power supply mode to the inverter power supply mode is not properly performed, in view of the operation status of the uninterruptible power supply device.

Power-failure voltage maximum value transition storage unit 50, receiving the switch command, selects a temporal transition of the power-failure maximum value Vmi specified by the switch command from among a plurality of temporal transitions of the power-failure maximum value Vmi and outputs the selected temporal transition to comparison unit 52. Comparison unit 52 detects a power failure of AC power source 1 by comparing the temporal transition of the power-failure maximum value Vmi after switching, provided by power-failure voltage maximum value transition storage unit 50, with the temporal transition of the maximum value estimated value Vme read from voltage maximum value transition storage unit 48.

(Flowchart)

Figure 16:
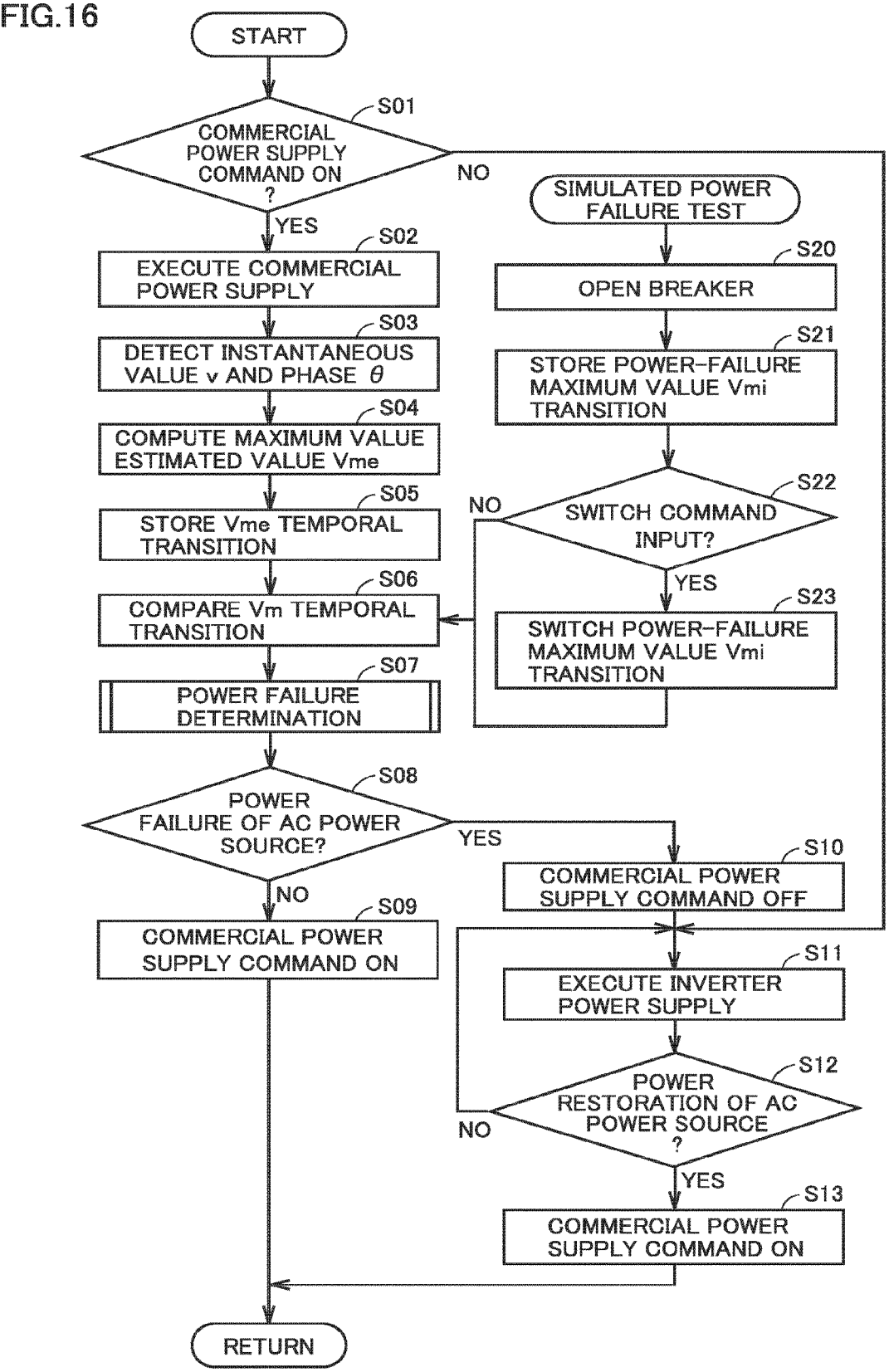
FIG. 16 is a flowchart for explaining the procedure of operation mode switching control in the uninterruptible power supply device according to the third embodiment.

FIG. 16 is a flowchart for explaining the procedure of operation mode switching control in the uninterruptible power supply device according to the third embodiment. The flowchart shown in FIG. 16 additionally includes steps S22 and S23 in the flowchart shown in FIG. 7.

Control device 20 carries out a simulated power failure test in steps S20 and S21 to store a plurality of temporal transitions of the power-failure maximum value Vmi with maximum value decrease rates different from each other. When receiving a switch command from an upper-level control unit (the determination is YES in S22), control device 20 switches the temporal transition of the power-failure maximum value Vmi in accordance with the switch command (step S23). On the other hand, if a switch command is not accepted (the determination is NO in S22), control device 20 does not switch the temporal transition of the power-failure maximum value Vmi.

Thus, upon accepting a switch command, control device 20 compares the temporal transition of the maximum value estimated value Vme stored in step S05 with the temporal transition of the power-failure maximum value Vmi switched in step S23 (step S06). Control device 20 determines whether a power failure has occurred in AC power source 1, based on the comparison result (step S07).

As described above, the uninterruptible power supply device according to the third embodiment allows switching between the temporal transitions of the power-failure maximum value Vmi, thereby reducing a mismatch with temporal transition of the maximum value estimated value Vme when a power failure actually occurs in AC power source 1. As a result, a power failure of AC power source 1 can be detected fast and accurately.

Fourth Embodiment

In the foregoing third embodiment, temporal transitions of the power-failure maximum value Vmi for use in detection of a power failure of AC power source 1 are switched, for example, in response to a switch command based on input operation from a user. However, control device 20 may autonomously switch temporal transitions of the power-failure maximum value Vmi.

In the uninterruptible power supply device according to a fourth embodiment, during the commercial power supply mode, temporal transition of the power-failure maximum value Vmi is learned based on temporal transition of the maximum value estimated value Vme. A power failure of AC power source 1 is detected using the learning value of temporal transition of the power-failure maximum value Vmi.

Figure 17:
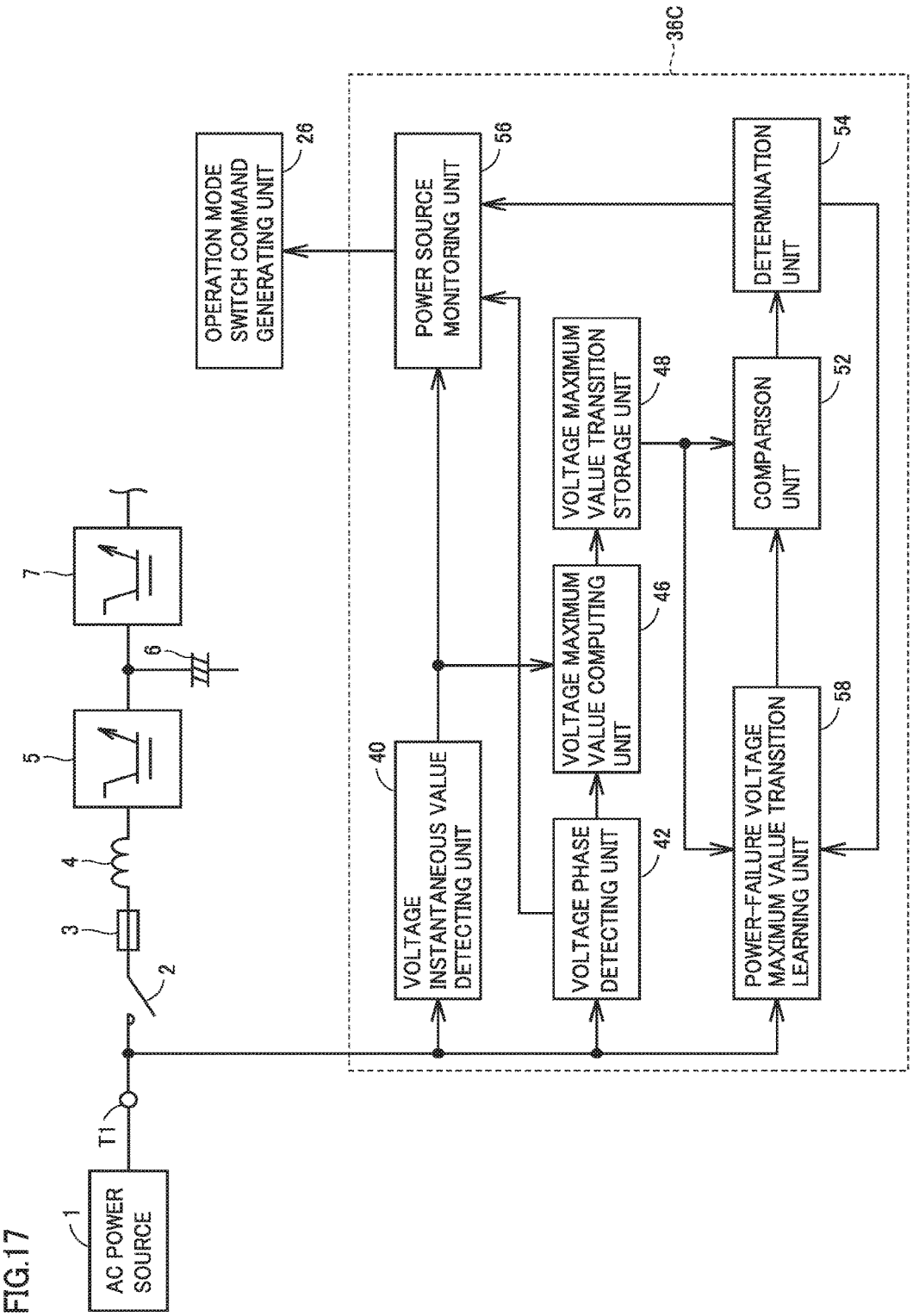
FIG. 17 is a functional block diagram showing a control configuration of the power source abnormality detecting unit in the uninterruptible power supply device according to a fourth embodiment.

The uninterruptible power supply device according to the fourth embodiment basically has a configuration similar to uninterruptible power supply device 100 shown in FIG. 1 but differs in that it includes a power source abnormality detecting unit 36C shown in FIG. 17 in place of power source abnormality detecting unit 36.

Referring to FIG. 17, power source abnormality detecting unit 36C includes a power-failure voltage maximum value transition learning unit 58. Power-failure voltage maximum value transition learning unit 58 acquires temporal transition of the maximum value estimated value Vme stored in voltage maximum value transition storage unit 48. The temporal transition of the maximum value estimated value Vme in the commercial power supply mode is stored in voltage maximum value transition storage unit 48. The temporal transition of the maximum value estimated value Vme includes a plurality of decreases caused by a power failure that occurs in AC power source 1.

Power-failure voltage maximum value transition learning unit 58 extracts a plurality of maximum value decrease rates when the maximum value estimated value Vme decreases, from the temporal transition of the maximum value estimated value Vme. Then, based on the extracted maximum value decrease rates, the maximum value decrease rate of the power-failure maximum value Vmi is learned. For example, power-failure voltage maximum value transition learning unit 58 sets the most frequent value of a plurality of maximum value decrease rates as the learning value of maximum value decrease rate of the power-failure maximum value Vmi.

The learning value of maximum value decrease rate of the power-failure maximum value Vmi may be the average value of a plurality of maximum value decrease rates or may be the maximum value decrease rate when the maximum value estimated value Vme decreases most recently.

Power-failure voltage maximum value transition learning unit 58 updates the temporal transition of the power-failure maximum value Vmi acquired by a simulated power failure test with the learning value of temporal transition of the power-failure maximum value Vmi. During the commercial power supply mode, power-failure voltage maximum value transition learning unit 58 updates the learning value of temporal transition of the power-failure maximum value Vmi, based on the temporal transition of the maximum value estimated value Vme.

Power-failure voltage maximum value transition learning unit 58 outputs the learning value of temporal transition of the power-failure maximum value Vmi to comparison unit 52. Comparison unit 52 detects a power failure of AC power source 1 by comparing the learning value of temporal transition of the power-failure maximum value Vmi, provided by power-failure voltage maximum value transition learning unit 58, with the temporal transition of the maximum value estimated value Vme read from voltage maximum value transition storage unit 48.

(Flowchart)

Figure 18:
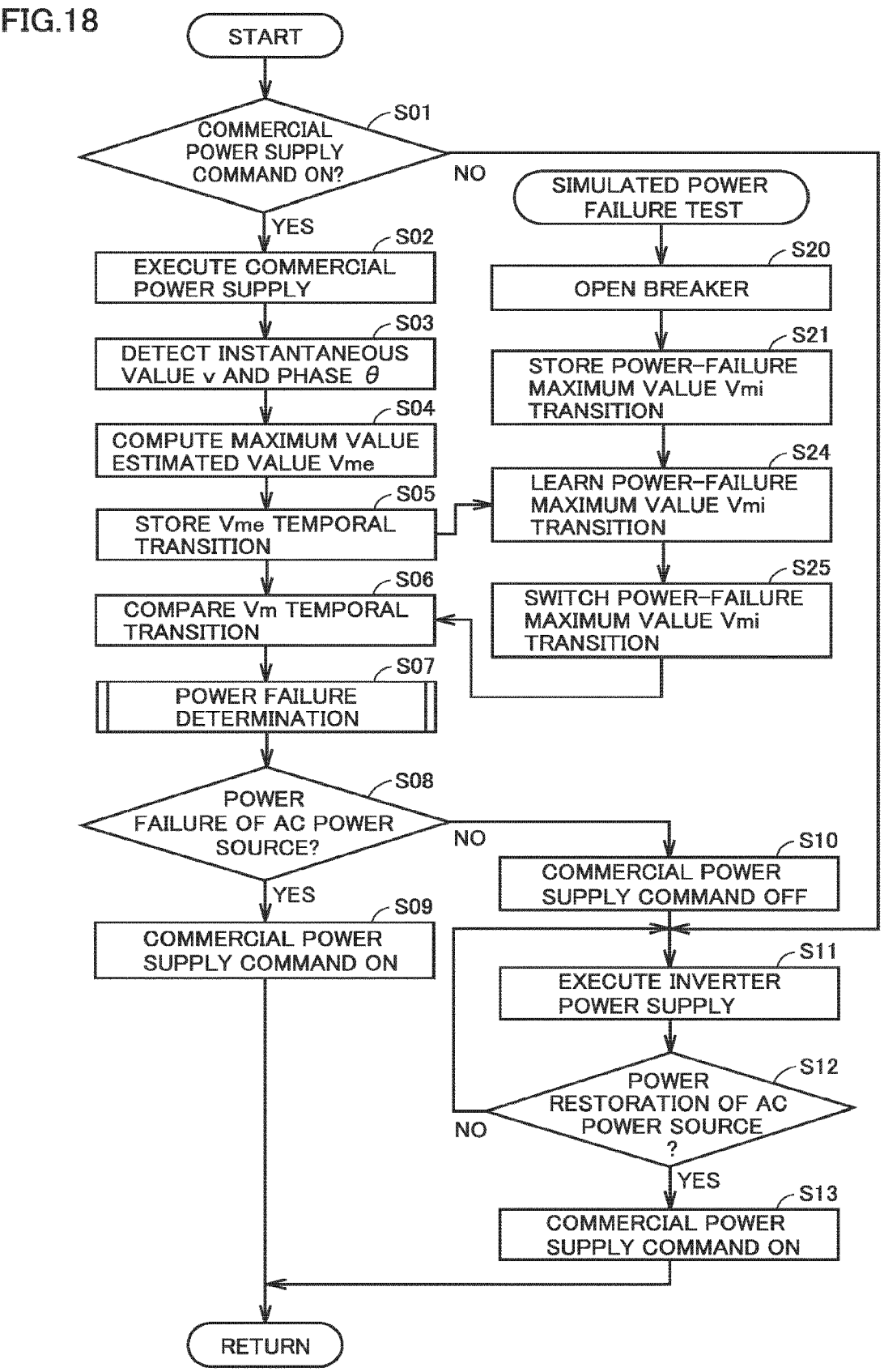
FIG. 18 is a flowchart for explaining the procedure of operation mode switching control in the uninterruptible power supply device according to the fourth embodiment.

FIG. 18 is a flowchart for explaining the procedure of operation mode switching control in the uninterruptible power supply device according to the fourth embodiment. The flowchart shown in FIG. 18 additionally includes steps S24 and S25 in the flowchart shown in FIG. 7.

Control device 20 carries out a simulated power failure test in steps S20 and S21 to store the temporal transition of the power-failure maximum value Vmi in the simulated power failure. Control device 20 further successively learns the temporal transition of the power-failure maximum value Vmi (maximum value decrease rate), based on the temporal transition of the maximum value estimated value Vme in the commercial power supply mode (step S24). Control device 20 successively updates the learning value of temporal transition of the power-failure maximum value Vmi to switch the temporal transition of the power-failure maximum value Vmi (step S25).

Control device 20 compares the temporal transition of the maximum value estimated value Vme stored in step S05 with the learning value of temporal transition of the power-failure maximum value Vmi switched in step S25 (step S06). Control device 20 determines whether a power failure occurs in AC power source 1, based on the comparison result (step S07).

As described above, the uninterruptible power supply device according to the fourth embodiment can learn the temporal transition of the power-failure maximum value Vmi for use in detection of a power failure of AC power source 1, from the operating conditions of the uninterruptible power supply device. The learning value of temporal transition of the power-failure maximum value Vmi is then used to reduce a mismatch between the temporal transition of the power-failure maximum value Vmi and the temporal transition of the maximum value estimated value Vme when a power failure actually occurs in AC power source 1. As a result, a power failure of the AC power source can be detected fast and accurately.

Furthermore, in the uninterruptible power supply device according to the fourth embodiment, the learning value of the power-failure maximum value Vmi reflects the environment in which the uninterruptible power supply device is installed. Therefore, a power failure of the AC power source can be detected fast and accurately irrespective of the environment in which the uninterruptible power supply device is installed.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST

1 AC power source, 2, 10, 13, 15 contactor, 11 load, 3, 16 fuse, 4, 8 reactor, 5 converter, 6 electrolytic capacitor, 7 inverter, 12 thyristor switch, 14 storage battery, 20 control device, 22 UPS start command unit, 24 operation command unit, 26 operation mode switch command generating unit, 28 converter control unit, 30 inverter control unit, 32 switch control unit, 36, 36A, 36B, 36C power source abnormality detecting unit, 40 voltage instantaneous value detecting unit, 42 voltage phase detecting unit, 46 voltage maximum value computing unit, 48 voltage maximum value transition storage unit, 50 power-failure voltage maximum value transition storage unit, 52 comparison unit, 54 determination unit, 54A first determination unit, 54B second determination unit, 56 power source monitoring unit, 58 power-failure voltage maximum value transition learning unit, 100 uninterruptible power supply device, T1 input terminal, T2 output terminal, Vm maximum value, Vme maximum value estimated value, Vmi maximum value during power failure.

The invention claimed is:

1. An uninterruptible power supply device connected between an AC power source and a load, the uninterruptible power supply device comprising:
    an input terminal receiving alternating-current (AC) power output from the AC power source;
    an output terminal connected to the load;
    a converter connected to the input terminal and configured to convert the AC power into direct-current (DC) power;
    an inverter configured to convert DC power output by the converter or DC power of a power storage device into AC power;
    a first switch connected between the input terminal and the output terminal;
    a second switch connected between the inverter and the output terminal; and
    a control device configured to control the uninterruptible power supply device,
    the uninterruptible power supply device being configured to selectively execute a first mode and a second mode, in the first mode the first switch is turned on and the second switch is turned off to supply AC power from the AC power source to the load through the first switch, in the second mode the second switch is turned on and the first switch is turned off to supply AC power generated by the inverter to the load,
    the control device including
        a power source abnormality detecting unit configured to detect a power failure of the AC power source, and
        a control unit configured to control on/off of the first and second switches and power conversion in the inverter so as to make a transition to the second mode, when a power failure of the AC power source is detected in a case where the first mode is selected,
    the power source abnormality detecting unit including
        a voltage detecting unit configured to detect an instantaneous value of AC input voltage supplied from the AC power source to the input terminal,
        a phase detecting unit configured to detect a phase of the AC input voltage,
        a computation unit configured to compute an estimated value of a maximum value of the AC input voltage, based on detected values of the voltage detecting unit and the phase detecting unit,
        a first storage unit configured to store temporal transition of the maximum value when the AC power source undergoes a simulated power failure, and
        a determination unit configured to determine a power failure of the AC power source, based on comparison between temporal transition of the estimated value of the maximum value and temporal transition of the maximum value stored in the first storage unit.

2. The uninterruptible power supply device according to claim 1, wherein
    each of the first switch and the second switch is configured with a mechanical switch,
    the uninterruptible power supply device further comprises a semiconductor switch connected in parallel with the first switch, and
    the control unit is configured to turn on the semiconductor switch for a predetermined time when a transition is made from the first mode to the second mode.

3. The uninterruptible power supply device according to claim 2, wherein
    the determination unit is further configured to determine whether there is a possibility of power failure of the AC power source, based on temporal transition of the estimated value of the maximum value, when it is determined that the AC power source is normal, and the control unit is configured to, in a case where the first mode is selected:

turn on the semiconductor switch and turn off the first switch to continue the first mode when it is determined that there is a possibility of power failure of the AC power source, and turn on the second switch and turn off the semiconductor switch to make a transition to the second mode when a power failure of the AC power source is determined.

4. The uninterruptible power supply device according to claim 1, wherein the first storage unit is configured to store a plurality of temporal transitions of the maximum value with maximum value decrease rates different from each other, and the determination unit is configured to determine a power failure of the AC power source, based on comparison between temporal transition of the maximum value selected from among the plurality of temporal transitions of the maximum value and temporal transition of the estimated value of the maximum value.

5. The uninterruptible power supply device according to claim 1, further comprising a second storage unit configured to store temporal transition of the estimated value of the maximum value, wherein the first storage unit is configured to learn temporal transition of the maximum value during power failure, based on temporal transition of the estimated value of the maximum value stored in the second storage unit, and the determination unit is configured to determine a power failure of the AC power source, based on comparison between temporal transition of the estimated value of the maximum value and a learning value of temporal transition of the maximum value during power failure updated in the first storage unit.

\* \* \* \* \*